(12) United States Patent
Muto

(10) Patent No.: US 12,510,787 B2
(45) Date of Patent: Dec. 30, 2025

(54) DISPLAY DEVICE

(71) Applicant: FUJIFILM Corporation, Tokyo (JP)

(72) Inventor: Masakane Muto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 99 days.

(21) Appl. No.: 18/117,946

(22) Filed: Mar. 6, 2023

(65) Prior Publication Data

US 2023/0205011 A1 Jun. 29, 2023

Related U.S. Application Data

(63) Continuation of application No. 17/110,379, filed on Dec. 3, 2020, now abandoned, which is a continuation
(Continued)

(30) Foreign Application Priority Data

Jun. 4, 2018 (JP) .................................. 2018-107095

(51) Int. Cl.
*G02F 1/13363* (2006.01)
*G02F 1/1335* (2006.01)
(Continued)

(52) U.S. Cl.
CPC ........ *G02F 1/13363* (2013.01); *G02F 1/1336* (2013.01); *G02F 1/133614* (2021.01);
(Continued)

(58) Field of Classification Search
CPC ..... G02F 1/137; G02F 1/13725; H10K 59/12; H10K 59/10
See application file for complete search history.

(56) References Cited

U.S. PATENT DOCUMENTS

| 10,522,600 B2* | 12/2019 | Kim ..................... H10K 59/50 |
| 2005/0099113 A1 | 5/2005 | Yamada |

(Continued)

FOREIGN PATENT DOCUMENTS

| JP | 2003-109775 A | 4/2003 |
| JP | 2011-165664 A | 8/2011 |

(Continued)

OTHER PUBLICATIONS

Advisory Action for U.S. Appl. No. 17/110,379, dated Feb. 24, 2023.
(Continued)

*Primary Examiner* — Alexander P Gross
(74) *Attorney, Agent, or Firm* — Birch, Stewart, Kolasch & Birch, LLP

(57) ABSTRACT

The invention provides a display device in which the tint is difficult to observe in a case where white display is visually confirmed from a front direction, and the tint is also difficult to observe at any azimuthal angle in a case where white display is visually confirmed from an oblique direction. A display device of the invention includes, from a viewing side, an anisotropic light absorbing layer and a self light emitting display element which emits at least red light, green light, and blue light, the self light emitting display element has a microcavity structure, the anisotropic light absorbing layer is formed of a composition containing a dichroic substance and a liquid crystal compound, the dichroic substance has a maximum absorption wavelength of 400 to 500 nm, and the anisotropic light absorbing layer satisfies a requirement represented by Expression (1) and a requirement represented by Expression (2), $1.50 < A\max(60)/A(0)$  Expression (1)

$1.00 \leq A\max(60)/A\min(60) \leq 1.20$  Expression (2).

31 Claims, 2 Drawing Sheets

Related U.S. Application Data of application No. PCT/JP2019/021557, filed on May 30, 2019.

(51) Int. Cl.
*G02F 1/13357* (2006.01)
*H10K 59/80* (2023.01)

(52) U.S. Cl.
CPC .... *G02F 1/133638* (2021.01); *G02F 2201/08* (2013.01); *G02F 2202/022* (2013.01); *H10K 59/876* (2023.02)

(56) References Cited

U.S. PATENT DOCUMENTS

| | | |
|---|---|---|
| 2010/0134726 A1 | 6/2010 | Morishima et al. |
| 2011/0198629 A1 | 8/2011 | Lee et al. |
| 2013/0001600 A1 | 1/2013 | Lim et al. |
| 2013/0016296 A1 | 1/2013 | Fujita et al. |
| 2015/0192700 A1 | 7/2015 | Won et al. |
| 2015/0212246 A1* | 7/2015 | Yoshida ............... B05D 5/06 427/508 |
| 2015/0218453 A1* | 8/2015 | Kobayashi ............. B32B 37/24 526/257 |
| 2015/0362785 A1 | 12/2015 | Kim et al. |
| 2015/0378068 A1* | 12/2015 | Hatanaka ............ G02B 5/3016 427/487 |
| 2016/0131809 A1* | 5/2016 | Takeda ................ G02F 1/13363 349/194 |
| 2016/0340367 A1 | 11/2016 | Katoh et al. |
| 2018/0030354 A1 | 2/2018 | Hida et al. |
| 2020/0117042 A1 | 4/2020 | Park |

FOREIGN PATENT DOCUMENTS

| | | |
|---|---|---|
| JP | 2015-197492 A | 11/2015 |
| JP | 2015-207377 A | 11/2015 |
| JP | 2016-216637 A | 12/2016 |
| JP | 2018-53167 A | 4/2018 |

OTHER PUBLICATIONS

Final Office Action for U.S. Appl. No. 17/110,379, dated Sep. 7, 2022.

International Preliminary Report on Patentability and Written Opinion of the International Searching Authority (Forms PCT/IB/326, PCT/IB/373 and PCT/ISA/237) for International Application No. PCT/JP2019/021557, dated Dec. 17, 2020, with English translation of the Written Opinion.

International Search Report (Form PCT/ISA/210) for International Application No. PCT/JP2019/021557, dated Sep. 3, 2019, with English translation.

Non Final Office Action for U.S. Appl. No. 17/110,379, dated Apr. 26, 2022.

* cited by examiner

DISPLAY DEVICE

CROSS-REFERENCE TO RELATED APPLICATIONS

This application is a Continuation of co-pending U.S. patent application Ser. No. 17/110,379, filed on Dec. 3, 2020, which is a Continuation of PCT International Application No. PCT/JP2019/021557 filed on May 30, 2019, which claims priority under 35 U.S.C. § 119(a) to Japanese Patent Application No. 2018-107095 filed on Jun. 4, 2018. The above application is hereby expressly incorporated by reference, in its entirety, into the present application.

BACKGROUND OF THE INVENTION

1. Field of the Invention

The present invention relates to a display device.

2. Description of the Related Art

In recent years, self light emitting display elements typified by organic electroluminescent elements (organic EL elements) have been attracting attention as a display element constituting a flat screen display device.

Among these, a self light emitting display element having a microcavity structure has excellent brightness and color purity as shown in JP2003-109775A. The microcavity structure is a structure in which an optical path length between upper and lower electrodes (that is, anode electrode and cathode electrode) of an organic material is matched to a peak wavelength of the spectrum of the light to be extracted, whereby only the light of a predetermined wavelength is resonated and the light of other wavelengths is weakened.

SUMMARY OF THE INVENTION

In the above-described display device, it is desirable that the color does not change in a case where the display is visually confirmed both from a direction normal to the light emitting surface (hereinafter, also referred to as "front direction") and from a direction oblique to the light emitting surface (that is, a direction tilted at a predetermined angle from the normal direction. Hereinafter, also referred to as "oblique direction").

However, in the self light emitting display element having a microcavity structure, the above-described problem is prominently seen. In particular, a tint is seen in many cases in a case where the display is visually confirmed from an oblique direction.

In the display device, it is desirable that the occurrence of tint is suppressed even in a case where the display is visually confirmed at any azimuthal angle.

An object of the invention is to provide a display device in which the tint is difficult to observe in a case where white display is visually confirmed from a front direction, and the tint is also difficult to observe at any azimuthal angle in a case where white display is visually confirmed from an oblique direction.

The inventors have conducted intensive studies on the above object, and as a result, found that the above object can be achieved by the following configurations.

(1) A display device comprising, from a viewing side:
an anisotropic light absorbing layer; and
a self light emitting display element which emits at least red light, green light, and blue light,
in which the self light emitting display element has a microcavity structure,
the anisotropic light absorbing layer is formed of a composition containing a dichroic substance and a liquid crystal compound,
the dichroic substance has a maximum absorption wavelength of 400 to 500 nm, and
the anisotropic light absorbing layer satisfies a requirement represented by Expression (1) to be described later and a requirement represented by Expression (2) to be described later.

(2) The display device according to (1), in which the dichroic substance has a polymerizable group.

(3) The display device according to (1) or (2), in which the liquid crystal compound has a polymerizable group.

(4) The display device according to any one of (1) to (3), in which the dichroic substance has a polymerizable group containing an ethylenically unsaturated bond and an aromatic ring,
the liquid crystal compound has a polymerizable group containing an ethylenically unsaturated bond and an aromatic ring, and
the anisotropic light absorbing layer satisfies a requirement represented by Expression (3) to be described later.

(5) The display device according to any one of (1) to (4), in which the composition further contains a polymerization initiator.

(6) The display device according to (5), in which the polymerization initiator is at least one selected from the group consisting of an oxime ester compound and an acylphosphine compound.

(7) The display device according to any one of (1) to (6), further comprising, at a position closer to the viewing side than the self light emitting display element: a polarizer; and a λ/4 plate,
in which the polarizer, the λ/4 plate, and the anisotropic light absorbing layer are disposed in order from the viewing side, or the polarizer, the anisotropic light absorbing layer, and the λ/4 plate are disposed in order from the viewing side.

According to the invention, it is possible to provide a display device in which the tint is difficult to observe in a case where white display is visually confirmed from a front direction, and the tint is also difficult to observe at any azimuthal angle in a case where white display is visually confirmed from an oblique direction.

DESCRIPTION OF THE PREFERRED EMBODIMENTS

Figure 1:
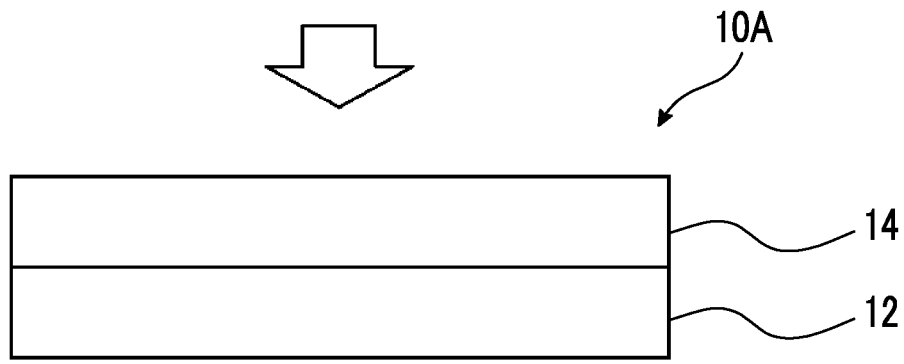
FIG. 1 is a schematic cross-sectional view of a display device according to a first embodiment of the invention.

Hereinafter, the invention will be described in detail. In this specification, a numerical range expressed using "to" means a range including numerical values before and after "to" as a lower limit and an upper limit. First, terms used in this specification will be described.

In the invention, Re (λ) and Rth (λ) represent an in-plane retardation and a thickness-direction retardation at a wavelength λ, respectively. Unless otherwise specified, the wavelength λ is 550 nm.

In the invention, Re (λ) and Rth (λ) are values measured at the wavelength λ in AxoScan OPMF-1 (manufactured by OPTO SCIENCE, INC.). By inputting an average refractive index ((nx+ny+nz)/3) and a film thickness (d(μm)) in AxoScan, a slow axis direction (°), $Re(\lambda) = R0(\lambda)$ $Rth(\lambda) = ((nx+ny)/2 - nz) \times d$ are calculated.

R0 (λ) means Re (λ), which is displayed as a numerical value calculated by AxoScan OPMF-1.

An average refractive index which is used in AxoScan is measured using an Abbe refractometer (NAR-4T, manufactured by ATAGO CO., LTD.) and a sodium lamp (λ=589 nm) as a light source. In the measurement of wavelength dependency, the wavelength dependency can be measured by a multi-wavelength Abbe refractometer DR-M2 (manufactured by ATAGO CO., LTD.) in combination with a dichroic filter.

In addition, values in Polymer Handbook (JOHN WILEY & SONS, INC) and catalogs of various optical films can be used. Examples of the average refractive indices of main optical films are as follows: cellulose acylate (1.48), cycloolefin polymer (1.52), polycarbonate (1.59), polymethylmethacrylate (1.49), polystyrene (1.59).

In this specification, the angles (for example, "90°") and relationships related thereto (for example, "orthogonal", "parallel", and "intersecting at 45°") include an error range allowable in the technical field to which the invention belongs. For example, the allowable error range means a range of strict angle 10°, and the difference between the strict angle and the error angle is preferably 5° or less, and more preferably 3° or less.

In this specification, blue light means light having a wavelength of 400 to 500 nm, green light means light having a wavelength of more than 500 nm to 600 nm, and red light means light having a wavelength of more than 600 nm to 700 nm.

One feature of the display device according to the embodiment of the invention is the use of an anisotropic light absorbing layer satisfying requirements represented by Expressions (1) and (2) to be described later.

First, in a self light emitting display element having a microcavity structure, the brightness and color purity are particularly improved in a direction normal to the light emitting surface (front direction). Meanwhile, since the resonance conditions vary between the front direction and the oblique direction, the light emitted in the oblique direction shifts to the short wavelength side, and as a result, a color change occurs between the front direction and the oblique direction. Therefore, for example, in a self light emitting display element realizing irradiation of white light by emitting red light, green light, and blue light, white light is observed in the front direction, but in the oblique direction, light shifted to blue is observed.

Regarding this, first, the anisotropic light absorbing layer contains a dichroic substance having a maximum absorption wavelength in a range of blue light. As shown by the requirement represented by Expression (1), the anisotropic light absorbing layer has a larger absorbance for blue light (wavelength: 400 to 500 nm) in the oblique direction (direction at a polar angle of 60°) than in the front direction. That is, the blue light traveling obliquely to the anisotropic light absorbing layer is absorbed more than the blue light traveling in the front direction. As described above, among the light rays emitted from the self light emitting display element having a microcavity structure, the light rays emitted in the oblique direction shift to blue. In a case where the above light rays enter the anisotropic light absorbing layer, the blue light is absorbed, and as a result, the light passing through the anisotropic light absorbing layer becomes white light. That is, an observer can observe white light even in a case where the observer visually confirms the display device according to the embodiment of the invention from an oblique direction.

In addition, as shown by the requirement represented by Expression (2), the anisotropic light absorbing layer has a smaller ratio of the maximum absorbance to the minimum absorbance, measured at all azimuthal angles in an oblique direction (direction at a polar angle of 60°). That is, in the anisotropic light absorbing layer, the difference in absorbance between all respective azimuthal angles in an oblique direction is small. Accordingly, an observer can observe white light even in a case where the observer observes the display device according to the embodiment of the invention at any azimuthal angle in an oblique direction.

First Embodiment

FIG. 1 shows a schematic cross-sectional view of a display device according to a first embodiment of the invention.

As shown in FIG. 1, a display device 10A includes a self light emitting display element 12 and an anisotropic light absorbing layer 14. In FIG. 1, an observer observes the display device from a direction of the white arrow. Accordingly, the display device 10A includes the anisotropic light absorbing layer 14 and the self light emitting display element 12 in this order from the viewing side.

Hereinafter, the members constituting the display device will be described in detail.

<Self Light Emitting Display Element>

The self light emitting display element is a display element which emits at least red light, green light, and blue light. The self light emitting display element is not particularly limited in type as long as it can emit the lights of red, green, and blue, and an organic electroluminescent element (organic EL element) is preferable. The organic EL element may be a top emission type organic EL element or a bottom emission type organic EL element.

The self light emitting display element has a microcavity structure. As described above, the microcavity structure is a structure in which an optical path length between upper and lower electrodes of an organic material is matched to a peak wavelength of the spectrum of the light to be extracted, whereby only the light of a predetermined wavelength is resonated and the light of other wavelengths is weakened. More specifically, the microcavity structure is a structure in which by matching an optical path length between upper and lower electrodes of an organic EL element to peak wavelengths of red light, green light, and blue light emitted from the organic EL element, light is repeatedly reflected between the electrodes, and thus only the light of the peak wavelength is resonated and emphasized, and the light of wavelengths outside the peak wavelength is attenuated (microcavity effect).

The microcavity structure may be a structure capable of obtaining the above effects, and a known structure is employed.

<Anisotropic Light Absorbing Layer>

The anisotropic light absorbing layer is a layer which is disposed on the self light emitting display element and satisfies the requirements represented by Expressions (1) and (2).

$$1.50 < A\max(60)/A(0) \qquad \text{Expression (1)}$$

$$1.00 \leq A\max(60)/A\min(60) \leq 1.20. \qquad \text{Expression (2)}$$

Figure 2:
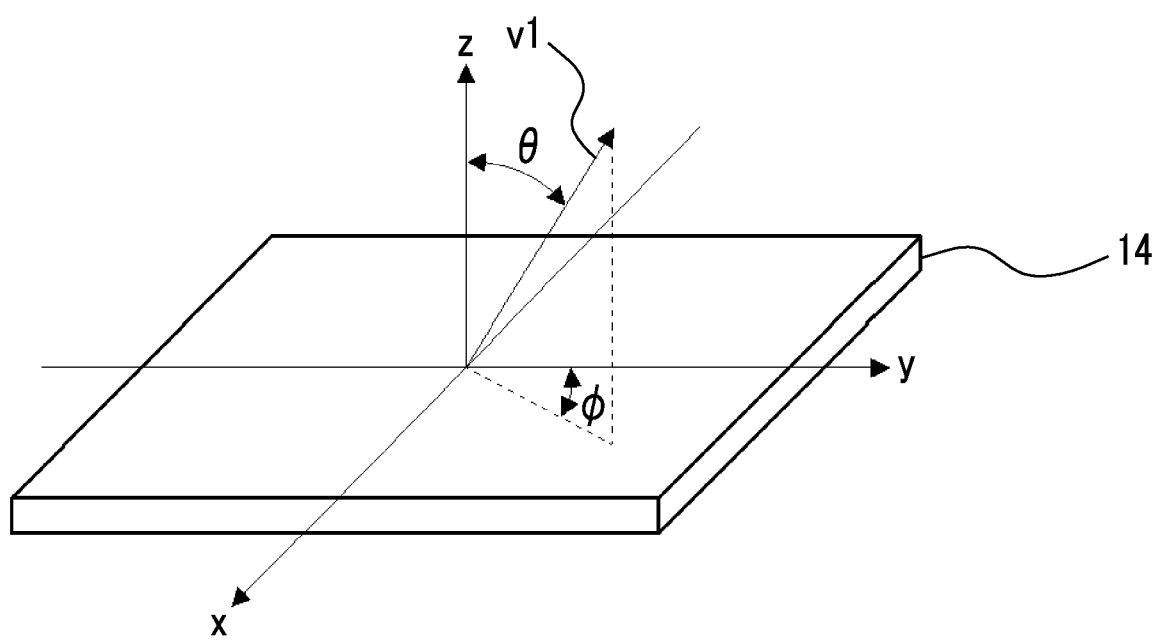
FIG. 2 is a diagram for illustrating definitions of a polar angle and an azimuthal angle.

In this specification, a coordinate system shown in FIG. 2 is employed. A plane of the anisotropic light absorbing layer 14 (main surface: a surface perpendicular to a thickness direction) is defined as an xy plane, an angle θ formed between a vector v1 and a z-axis is defined as a polar angle, and an angle φ formed between the projection of the vector v1 to the xy plane and a y-axis is defined as an azimuthal angle. Accordingly, as will be described later, a polar angle of 60° means that θ in FIG. 2 is 60°, and the expression all azimuthal angles at a polar angle of 60° means φ of 0° to 360° in a case where θ in FIG. 2 is 60°.

First, Amax (60) represents the highest absorbance in a case where the absorbance of the anisotropic light absorbing layer at the maximum absorption wavelength of a dichroic substance to be described later is measured at all azimuthal angles at a polar angle of 60° from the normal direction of the anisotropic light absorbing layer.

Amin (60) represents the lowest absorbance in a case where the absorbance of the anisotropic light absorbing layer at the maximum absorption wavelength of a dichroic substance to be described later is measured at all azimuthal angles at a polar angle of 60° from the normal direction of the anisotropic light absorbing layer.

A (0) represents the absorbance in a case where the absorbance of the anisotropic light absorbing layer at the maximum absorption wavelength of a dichroic substance to be described later is measured in the normal direction of the anisotropic light absorbing layer.

In a method of measuring the absorbance, the absorbance of the anisotropic light absorbing layer at each wavelength is obtained in the normal direction of the anisotropic light absorbing layer at all azimuthal angles at a polar angle of 60° by using a spectrophotometer (UV-3150 manufactured by Shimadzu Corporation) (method: double beam method, wavelength range: 380 to 680 nm in 2 nm-steps), and the absorbance at the maximum absorption wavelength is obtained.

The anisotropic light absorbing layer preferably satisfies a requirement represented by Expression (1-1), and more preferably satisfies a requirement represented by Expression (1-2) from the viewpoint that the tint is more difficult to observe in a case where the display device performing white display is visually confirmed from an oblique direction.

$$1.70 < A\max(60)/A(0) \qquad \text{Expression (1-1)}$$

$$1.80 < A\max(60)/A(0) \qquad \text{Expression (1-2)}$$

The upper limit of Amax (60)/A (0) is not particularly limited, but is often 10,000 or less, and more often 100 or less.

The anisotropic light absorbing layer preferably satisfies a requirement represented by Expression (2-1), and more preferably satisfies a requirement represented by Expression (2-2) from the viewpoint that the tint is more difficult to observe at any azimuthal angle in a case where the display device performing white display is visually confirmed from an oblique direction.

$$1.00 \leq A\max(60)/A\min(60) \leq 1.10 \qquad \text{Expression (2-1)}$$

$$1.00 \leq A\max(60)/A\min(60) \leq 1.05 \qquad \text{Expression (2-2)}$$

The anisotropic light absorbing layer preferably satisfies a requirement represented by Expression (5-1), and more preferably satisfies a requirement represented by Expression (5-2) from the viewpoint that the tint is more difficult to observe in a case where the display device performing white display is visually confirmed from a front direction.

$$0 \leq A(0) \leq 0.40 \qquad \text{Expression (5-1)}$$

$$0 \leq A(0) \leq 0.30 \qquad \text{Expression (5-2)}$$

The anisotropic light absorbing layer preferably satisfies a requirement represented by Expression (6-1), and more preferably satisfies a requirement represented by Expression (6-2) from the viewpoint that the tint is more difficult to observe in a case where the display device performing white display is visually confirmed from an oblique direction.

$$0.25 \leq A\max(60) \leq 0.55 \qquad \text{Expression (6-1)}$$

$$0.30 \leq A\max(60) \leq 0.50 \qquad \text{Expression (6-2)}$$

As described later, the anisotropic light absorbing layer is formed of a composition containing a dichroic substance and a liquid crystal compound.

In a case where the dichroic substance has a polymerizable group including an ethylenically unsaturated bond and an aromatic ring and the liquid crystal compound has a polymerizable group including an ethylenically unsaturated bond and an aromatic ring, the anisotropic light absorbing layer preferably satisfies a requirement represented by Expression (3).

$$0.85 \leq P1/P2 \leq 1.00 \qquad \text{Expression (3)}$$

P1 represents a smaller value between a P value in one surface and a P value in the other surface, where the two surfaces (which means two main surfaces, in other words, two surfaces orthogonal to the thickness direction of the anisotropic light absorbing layer) of the anisotropic light absorbing layer are perpendicular to the thickness direction.

P2 represents a larger value between the P value in the one surface and the P value in the other surface, where the two surfaces of the anisotropic light absorbing layer are perpendicular to the thickness direction.

The P value represents a value represented by I(1)/I(2). I(1) represents a peak intensity derived from in-plane deformation vibration of an ethylenically unsaturated bond in infrared total reflection absorption spectrum measurement, and I(2) represents a peak intensity derived from stretching vibration of an unsaturated bond of an aromatic ring in the infrared total reflection absorption spectrum measurement.

In a case where the P value in the one surface and the P value in the other surface, where the two surfaces of the anisotropic light absorbing layer are perpendicular to the thickness direction, are the same, P1/P2 is 1.00.

The P value represents a ratio of a peak intensity derived from in-plane deformation vibration of an ethylenically unsaturated bond to a peak intensity derived from stretching vibration of an unsaturated bond of an aromatic ring in the infrared total reflection absorption spectrum measurement. In curing the dichroic substance and the liquid crystal compound, the unsaturated bond of the aromatic ring does not react, but the ethylenically unsaturated bond disappears.

Accordingly, by determining the P value with the peak intensity of the unsaturated bond of the aromatic ring which does not react as a relative reference, a degree of polymerization in one surface of the anisotropic light absorbing layer can be calculated.

In a case where P1/P2 is within the range of Expression (3), it means that the polymerization favorably progresses in both of the two surfaces of the anisotropic light absorbing layer, and the anisotropic light absorbing layer has more excellent durability.

The range of each of P1 and P2 is preferably 0.3 or less, and more preferably 0.2 or less from the viewpoint that the anisotropic light absorbing layer has more excellent durability. The lower limit is, for example, 0.

The anisotropic light absorbing layer preferably has an absorption axis in the thickness direction. Having an absorption axis in the thickness direction means that the absorbance in the thickness direction is larger than that in the in-plane direction.

The absorption axis of the anisotropic light absorbing layer is preferably substantially parallel to the thickness direction. In other words, the absorption axis of the anisotropic light absorbing layer is preferably vertically aligned with respect to the surface (main surface) of the anisotropic light absorbing layer.

Here, "substantially parallel" means that the angle formed between the absorption axis and the thickness direction is 0° to 10°.

A method of vertically aligning the dichroic substance may be used in order for the anisotropic light absorbing layer to have an absorption axis in the thickness direction. In other words, a method of aligning the dichroic substance may be used such that a major axis direction of the dichroic substance is substantially parallel to the thickness direction of the anisotropic light absorbing layer. The definition of the substantially parallel is as described above.

The anisotropic light absorbing layer is formed of a composition containing a dichroic substance and a liquid crystal compound.

Hereinafter, components contained in the composition will be described in detail.

(Dichroic Substance)

The dichroic substance refers to a substance having a property in which an absorbance in a major axis direction of the molecule and an absorbance in a minor axis direction are different.

Examples of the dichroic substance include a rod-like dichroic substance and a disc-shaped dichroic substance based on the molecular shape thereof, and a rod-like dichroic substance is preferable.

The maximum absorption wavelength of the dichroic substance is 400 to 500 nm. From the viewpoint that the effects of the invention are further enhanced, the maximum absorption wavelength of the dichroic substance is preferably 440 to 480 nm.

In a method of measuring the maximum absorption wavelength of the dichroic substance, a chloroform solution containing a dichroic substance (concentration: 10 mg/L) and a reference containing no dichroic substance are prepared, and the absorption spectrum of the dichroic substance is measured by using a spectrophotometer (UV-3150 manufactured by Shimadzu Corporation) (method: double beam method, wavelength range: 380 to 680 nm in 2 nm-steps) to obtain the polar absorption wavelength of the dichroic substance.

Examples of the dichroic substance include acridine dyes, oxazine dyes, cyanine dyes, naphthalene dyes, azo dyes, and anthraquinone dyes, and azo dyes are preferable. Examples of the azo dye include monoazo dyes, bisazo dyes, trisazo dyes, tetrakisazo dyes, and stilbeneazo dyes, and bisazo dyes or trisazo dyes are preferable. Compounds described in JP2018-053167A are also preferable.

The dichroic substance preferably has a polymerizable group. Since the dichroic substance has a polymerizable group, the degree of crosslinking of the anisotropic light absorbing layer is not reduced even in a case where the amount of the dichroic substance used is large, and hence it is possible to form an anisotropic light absorbing layer having excellent durability while exhibiting high selective wavelength absorption even with a small thickness.

Examples of the polymerizable group include polymerizable groups having an ethylenically unsaturated bond, such as a vinyl group, a vinyloxy group, a styryl group, a p-(2-phenylethenyl)phenyl group, an acryloyl group, a methacryloyl group, an acryloyloxy group, and a methacryloyloxy group, an epoxy group, and an oxetanyl group.

The dichroic substance preferably has an aromatic ring. Examples of the aromatic ring include aromatic hydrocarbon rings and aromatic heterocyclic rings. Among these, aromatic hydrocarbon rings are preferable, and a benzene ring is more preferable.

The azo dye is preferably a compound represented by Formula (10).

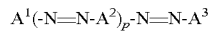

$$A^1(-N{=}N{-}A^2)_p{-}N{=}N{-}A^3 \qquad \text{Formula (10)}$$

In Formula (10), $A^1$ and $A^3$ each independently represent a phenyl group optionally having a substituent, a naphthyl group optionally having a substituent, or a monovalent heterocyclic group optionally having a substituent. $A^2$ represents a 1,4-phenylene group optionally having a substituent, a naphthalene-1,4-diyl group optionally having a substituent, or a divalent heterocyclic group optionally having a substituent. p represents an integer of 1 to 4. In a case where p is an integer of 2 or more, a plurality of $A^2$'s may be the same or different.

Examples of the monovalent heterocyclic group include groups obtained by removing one hydrogen atom from a heterocyclic compound such as quinoline, thiazole, benzothiazole, thienothiazole, imidazole, benzimidazole, oxazole, and benzoxazole.

Examples of the divalent heterocyclic group include groups obtained by removing two hydrogen atoms from the above heterocyclic compound.

Examples of the optional substituent of a phenyl group, a naphthyl group, and a monovalent heterocyclic group of $A^1$ and $A^3$, and a 1,4-phenylene group, a naphthalene-1,4-diyl group, and a divalent heterocyclic group of $A^2$ include an alkyl group having 1 to 4 carbon atoms such as a methyl group, an ethyl group, and a butyl group; an alkoxy group having 1 to 4 carbon atoms such as a methoxy group, an ethoxy group, and a butoxy group; a fluorinated alkyl group having 1 to 4 carbon atoms such as a trifluoromethyl group; a cyano group; a nitro group; a hydroxyl group; a halogen atom such as a chlorine atom and a fluorine atom; and a substituted or unsubstituted amino group such as an amino group, a diethylamino group, and a pyrrolidino group (the substituted amino group means an amino group having one or two alkyl groups having 1 to 6 carbon atoms, or an amino group in which two substituted alkyl groups are bonded to each other to form an alkanediyl group having 2 to 8 carbon atoms. The unsubstituted amino group is $-NH_2$).

Examples of the alkyl group having 1 to 6 carbon atoms include a methyl group, an ethyl group, and a hexyl group. Examples of the alkanediyl group having 2 to 8 carbon atoms include an ethylene group, a propane-1,3-diyl group, a butane-1,3-diyl group, a butane-1,4-diyl group, a pentane-1,5-diyl group, a hexane-1,6-diyl group, a heptane-1,7-diyl group, and an octane-1,8-diyl group.

The substituent of a phenyl group, a naphthyl group, and a monovalent heterocyclic group of $A^1$ and $A^3$ is preferably a substituent containing a polymerizable group.

The substituent containing a polymerizable group is preferably a group represented by Formula (11).

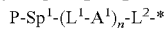

Formula (11)

P represents a polymerizable group. The definition of the polymerizable group is as described above.

$Sp^1$ represents an alkylene group having 2 to 16 carbon atoms, and non-adjacent —CH$_2$— groups in the alkylene group may be substituted with —CO— or —O—.

$L^1$ and $L^2$ each independently represent a single bond, —O—, —OCO—, —COO—, or —OCOO—.

$A^1$ represents a 1,4-phenylene group, a 1,3-phenylene group, a 1,4-naphthylene group, or a 1,5-naphthylene group optionally having a substituent.

n is an integer of 0 to 3.

Specific examples of the dichroic substance are as follows.

A-55
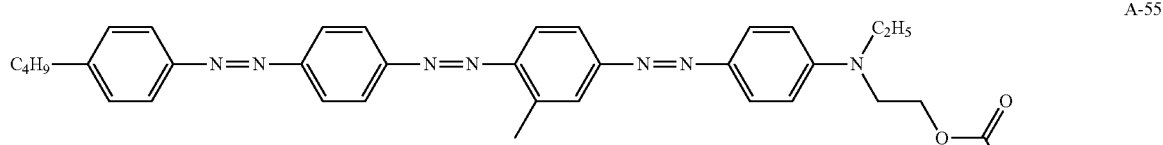

A-56
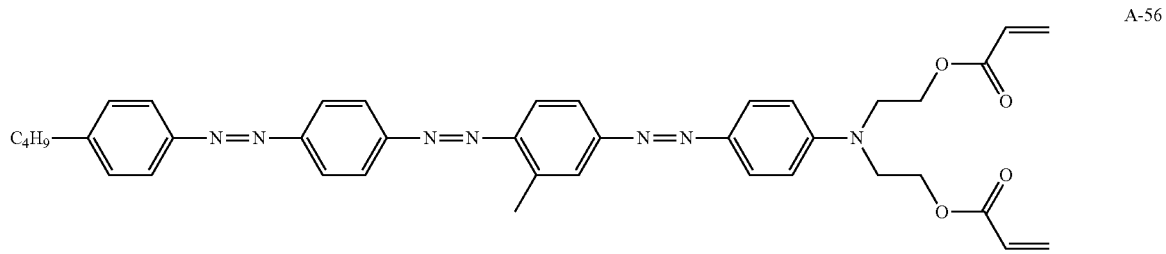

A-57

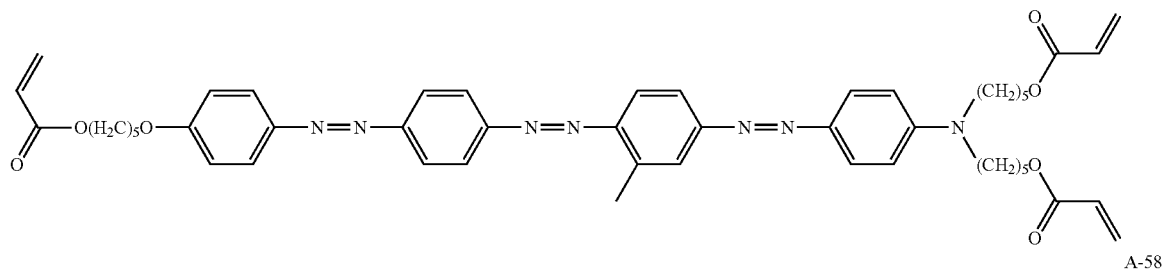

A-58
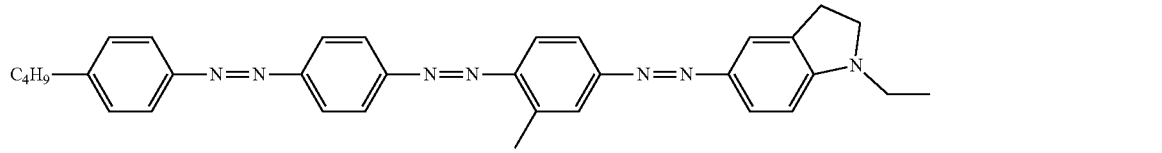

C-21
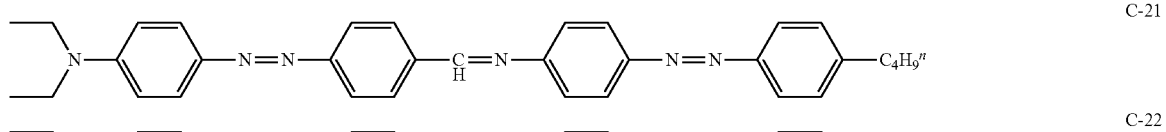

C-22
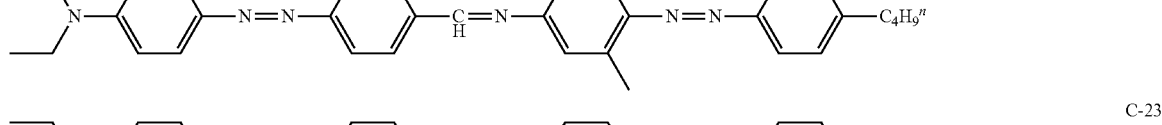

C-23

C-24
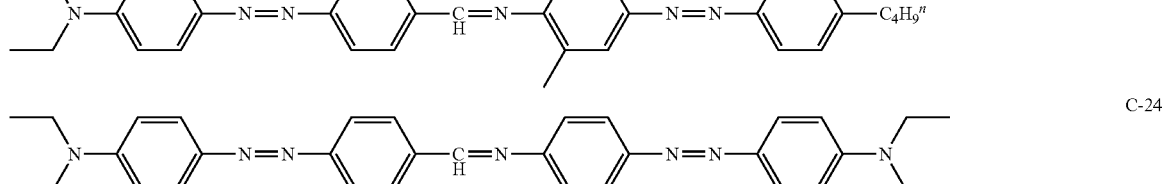

-continued

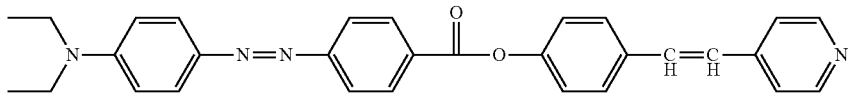
C-25

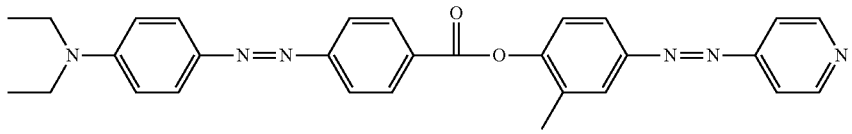
C-26

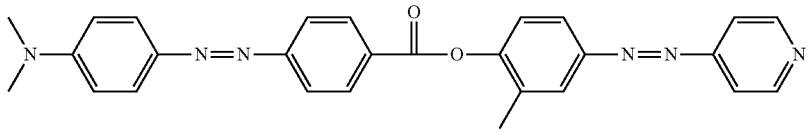
C-27

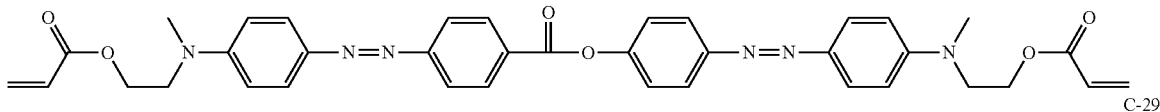
C-28

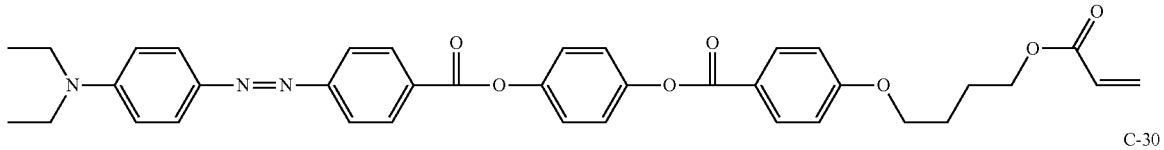
C-29

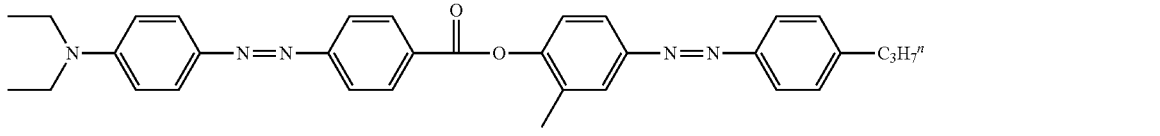
C-30

The content of the dichroic substance in the composition is preferably 70 to 130 parts by mass, and more preferably 80 to 120 parts by mass with respect to 100 parts by mass of the liquid crystal compound to be described later in the composition.

The dichroic substances may be used alone or in combination of two or more. In a case where two or more dichroic substances are used, the total amount thereof is preferably within the above range.

(Liquid Crystal Compound)

The liquid crystal compound preferably has a polymerizable group. That is, the composition preferably contains a polymerizable liquid crystal compound. The definition of the polymerizable group is as described in the section of Dichroic Substance.

The liquid crystal compound preferably has an aromatic ring. Examples of the aromatic ring include aromatic hydrocarbon rings and aromatic heterocyclic rings. Among these, aromatic hydrocarbon rings are preferable, and a benzene ring is more preferable.

Examples of the polymerizable liquid crystal compound include low-molecular-weight liquid crystal compounds having a polymerizable group and polymer liquid crystal compounds having a polymerizable group.

Here, the "low-molecular-weight liquid crystal compound" means a liquid crystal compound having no repeating unit in the chemical structure. The "polymer liquid crystal compound" means a liquid crystal compound having a repeating unit in the chemical structure.

Examples of the low-molecular-weight liquid crystal compound include compounds described in JP2013-228706A.

Examples of the polymer liquid crystal compound include thermotropic liquid crystalline polymers described in JP2011-237513A and side chain type liquid crystal compounds described in JP2015-107492A.

The low-molecular-weight liquid crystal compound can be roughly classified into a rod-like liquid crystal compound and a disk-like liquid crystal compound based on the molecular shape, and in a case where the dichroic dye has a rod-like shape, the low-molecular-weight liquid crystal compound is preferably a rod-like liquid crystal compound from the viewpoint of increasing the degree of alignment order.

The rod-like liquid crystal compound is preferably a compound represented by Formula (20).

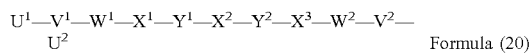

Formula (20)

In Formula (20), $X^1$, $X^2$, and $X^3$ each independently represent a 1,4-phenylene group optionally having a substituent or a cyclohexane-1,4-diyl group optionally having a substituent. At least one of $X^1$, $X^2$, or $X^3$ is a 1,4-phenylene group optionally having a substituent. —$CH_2$-constituting the cyclohexane-1,4-diyl group may be substituted with —O—, —S—, or —NR—. R represents an alkyl group having 1 to 6 carbon atoms or a phenyl group.

$Y^1$ and $Y^2$ each independently represent —$CH_2CH_2$—, —$CH_2O$—, —COO—, —OCOO—, a single bond, —N=N—, —$CR^a$=$CR^b$—, —C≡C—, or —$CR^a$=N—. $R^a$ and $R^b$ each independently represent a hydrogen atom or an alkyl group having 1 to 4 carbon atoms.

U¹ represents a hydrogen atom or a polymerizable group. The definition of the polymerizable group is as described above.

U² represents a polymerizable group. The definition of the polymerizable group is as described above.

W¹ and W² each independently represent a single bond, —O—, —S—, —COO—, or —OCOO—.

V¹ and V² each independently represent an alkanediyl group having 1 to 20 carbon atoms and optionally having a substituent, and —CH$_2$— constituting the alkanediyl group may be substituted with —O—, —S—, or —NH—.

At least one of X¹, X², or X³ is preferably a 1,4-phenylene group optionally having a substituent. The 1,4-phenylene group optionally having a substituent is preferably unsubstituted.

The cyclohexane-1,4-diyl group optionally having a substituent is preferably a trans-cyclohexane-1,4-diyl group optionally having a substituent. The trans-cyclohexane-1,4-diyl group optionally having a substituent is preferably unsubstituted.

Examples of the optional substituent of the 1,4-phenylene group optionally having a substituent or the cyclohexane-1,4-diyl group optionally having a substituent include an alkyl group having 1 to 4 carbon atoms such as a methyl group, an ethyl group, and a butyl group, a halogen atom such as a chlorine atom and a fluorine atom, and a cyano group.

Y¹ is preferably —CH$_2$CH$_2$—, —COO—, or a single bond, and Y² is preferably —CH$_2$CH$_2$— or —CH$_2$O—.

U¹ is preferably a polymerizable group.

As U¹ and U², a polymerizable group is preferable, and a photopolymerizable group is more preferable. A polymerizable liquid crystal compound having a photopolymerizable group can be polymerized under lower temperature conditions.

Examples of the alkanediyl group represented by V¹ and V² include a methylene group, an ethylene group, a propane-1,3-diyl group, a butane-1,3-diyl group, a butane-1,4-diyl group, a pentane-1,5-diyl group, a hexane-1,6-diyl group, a heptane-1,7-diyl group, an octane-1,8-diyl group, a decane-1,10-diyl group, a tetradecane-1,14-diyl group, and an icosane-1,20-diyl group.

As V¹ and V², an alkanediyl group having 2 to 12 carbon atoms is preferable, and an alkanediyl group having 6 to 12 carbon atoms is more preferable.

Examples of the optional substituent of the alkanediyl group having 1 to 20 carbon atoms and optionally having a substituent include a cyano group and a halogen atom such as a chlorine atom and a fluorine atom.

The alkanediyl group is preferably unsubstituted, and is more preferably an unsubstituted linear alkanediyl group.

W¹ and W² each independently preferably represent a single bond or —O—.

Specific examples of the compound represented by Formula (20) include compounds represented by Formulae (1-1) to (1-23) described in paragraphs 0053 to 0056 of JP2016-027387A.

The compounds represented by Formula (20) may be used alone or in combination of two or more.

In a case where two or more polymerizable liquid crystal compounds are combined, it is preferable that at least one is a compound represented by Formula (20), and it is more preferable that two or more are compounds represented by Formula (20).

In a case where two polymerizable liquid crystal compounds are combined, the mixing ratio is preferably 1:99 to 50:50, more preferably 5:95 to 50:50, and even more preferably 10:90 to 50:50.

The compound represented by Formula (20) can be produced by, for example, a known method described in Lub et al. Recl. Trav. Chim. Pays-Bas, 115, 321 to 328 (1996) or JP4719156B.

The polymer liquid crystal compound can be roughly classified into a main chain type liquid crystal compound and a side chain type liquid crystal compound. The main chain type liquid crystal compound is a compound having a structure exhibiting liquid crystallinity in the main chain of the polymer. The side chain type liquid crystal compound is a compound having a structure exhibiting liquid crystallinity in the side chain portion of the polymer. A side chain type liquid crystal compound is preferable from the viewpoint of a high degree of alignment order of an anisotropic light absorbing layer to be obtained and excellent solubility in a solvent in the preparation of the composition.

The polymerizable side chain type liquid crystal compound is preferably a (meth)acrylic resin, and more preferably a compound having a repeating unit represented by Formula (21).

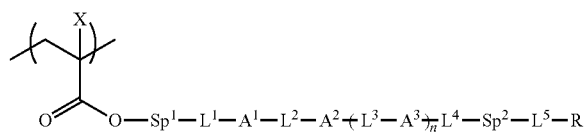

Formula (21)

Sp¹ represents an alkylene group having 2 to 16 carbon atoms or a polyalkyleneoxy group, and non-adjacent —CH$_2$— groups in the alkylene group may be substituted with —O—.

The number of carbon atoms of alkylene in the polyalkyleneoxy group is preferably 1 to 4, and more preferably 2 to 3.

Sp¹ is preferably an alkylene group having 2 to 10 carbon atoms or a polyalkyleneoxy group, and more preferably a polyalkyleneoxy group. In a case where Sp¹ is a polyalkyleneoxy group, the alignment property of the dichroic substance is further improved, and the effects of the invention are further enhanced.

Sp² represents a single bond or an alkylene group having 1 to 8 carbon atoms, and non-adjacent —CH$_2$— groups in the alkylene group may be substituted with —O—.

L¹ and L⁵ each independently represent a single bond, —O—, —OCO—, —COO—, or —OCOO—. L¹ and L⁵ are each independently preferably a single bond, —O—, —OCO—, or —COO—, and more preferably a single bond or —O—.

L² to L⁴ each independently represent a single bond, —OCO—, or —COO—. L² to L⁴ are each independently preferably a single bond or —COO—.

At least one of L¹, L², L³, L⁴, or L⁵ is preferably —OCO— or —COO—.

A¹ to A³ each independently represent an aromatic group optionally having a substituent or a cyclic aliphatic group optionally having a substituent. At least one of A¹, A², or A³ is preferably an aromatic group optionally having a substituent.

The aromatic group is preferably an aromatic group having 6 to 20 carbon atoms, more preferably an aromatic group having 6 to 14 carbon atoms, and even more preferably an aromatic group having 6 to 10 carbon atoms. Examples of the aromatic group include a 1,4-phenylene group, a 1,3-phenylene group, a 1,4-naphthylene group, a 1,5-naphthylene group, and an anthracenylene group.

The cyclic aliphatic group is preferably a cyclic aliphatic group having 3 to 10 carbon atoms, more preferably a cyclic aliphatic group having 4 to 8 carbon atoms, and even more preferably a cyclic aliphatic group having 5 or 6 carbon atoms. Examples of the cyclic aliphatic group include a cyclopentylene group and a cyclohexylene group.

The aromatic group and the aliphatic group may have a substituent. Examples of the substituent include a halogen atom, an alkyl group having 1 to 6 carbon atoms, a cyano group, a nitro group, a nitroso group, a carboxy group, an alkylsulfinyl group having 1 to 6 carbon atoms, an alkylsulfonyl group having 1 to 6 carbon atoms, a fluoroalkyl group having 1 to 6 carbon atoms, an alkoxy group having 1 to 6 carbon atoms, an alkylsulfanyl group having 1 to 6 carbon atoms, an N-alkylamino group having 1 to 6 carbon atoms, an N,N-dialkylamino group having 2 to 12 carbon atoms, an N-alkylsulfamoyl group having 1 to 6 carbon atoms, and an N,N-dialkylsulfamoyl group having 2 to 12 carbon atoms.

The substituent may further have the substituent.

R represents a polymerizable group. The definition of the polymerizable group is as described above.

The polymerizable group is preferably a radically polymerizable group or a cationically polymerizable group suitable for photopolymerization, and from the viewpoint of easy handling and production, an acryloyl group, a methacryloyl group, an acryloyloxy group, a methacryloyloxy group, an epoxy group, or an oxetanyl group is preferable.

X represents a hydrogen atom or a methyl group, and is preferably a hydrogen atom.

n represents 0 or 1.

Specific examples of the repeating unit represented by Formula (21) are shown below. Examples of the repeating unit include repeating units exemplified in JP2015-197492A in addition to the repeating units exemplified below.

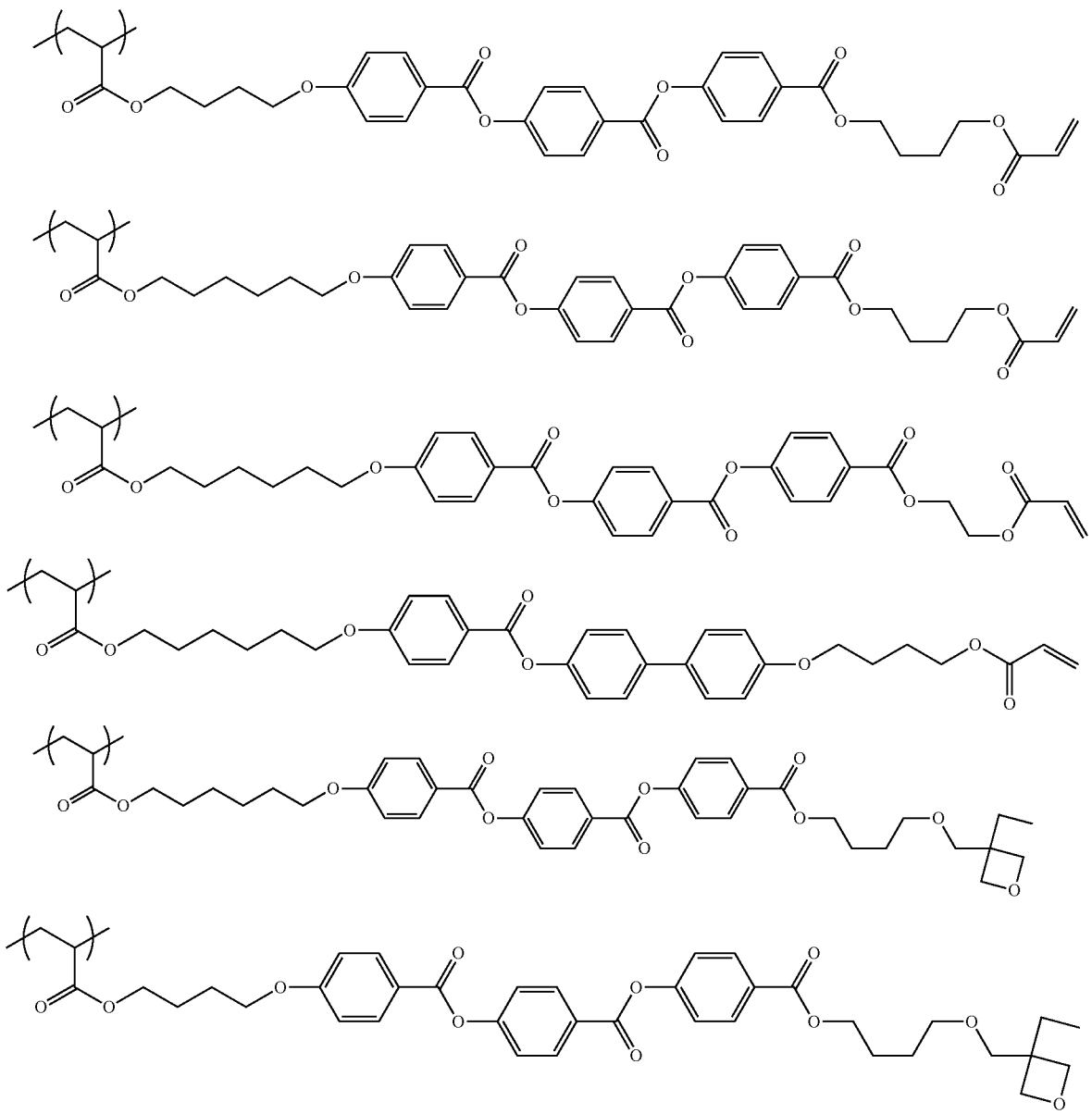

-continued

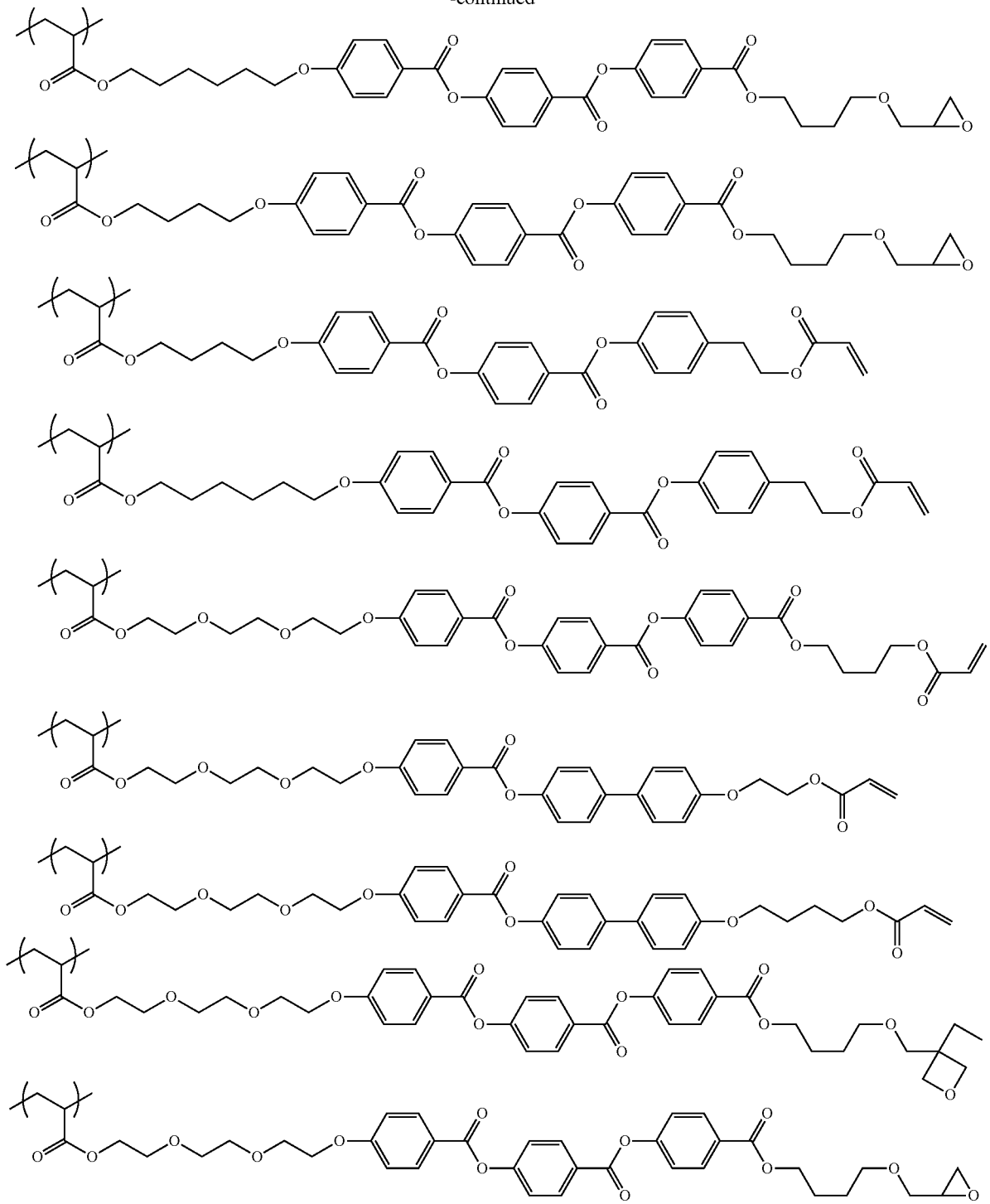

The compound having a repeating unit represented by Formula (21) can be synthesized by combining known synthetic reactions. That is, the compound can be synthesized by referring to methods described in various literatures (for example, Methoden der Organischen Chemie (edited by Houben-Weyl), Some specific methods (Thieme-Verlag, written by Stuttgart), Experimental Chemistry Course and New Experimental Chemistry Course). In addition, as a synthesis method, descriptions in U.S. Pat. Nos. 4,683,327A, 4,983,479A, 5,622,648A, 5,770,107A, WO95/022586A, WO97/000600A, WO98/047979A, and GB2297549B can also be referred to.

The compound having a repeating unit represented by Formula (21) may be a copolymer including a plurality of kinds of repeating units represented by Formula (21), or a copolymer including a repeating unit other than the repeating unit represented by Formula (21).

Specific examples of the repeating unit are as follows. Examples of the repeating unit include repeating units exemplified in JP2015-197492A in addition to the repeating units exemplified below.
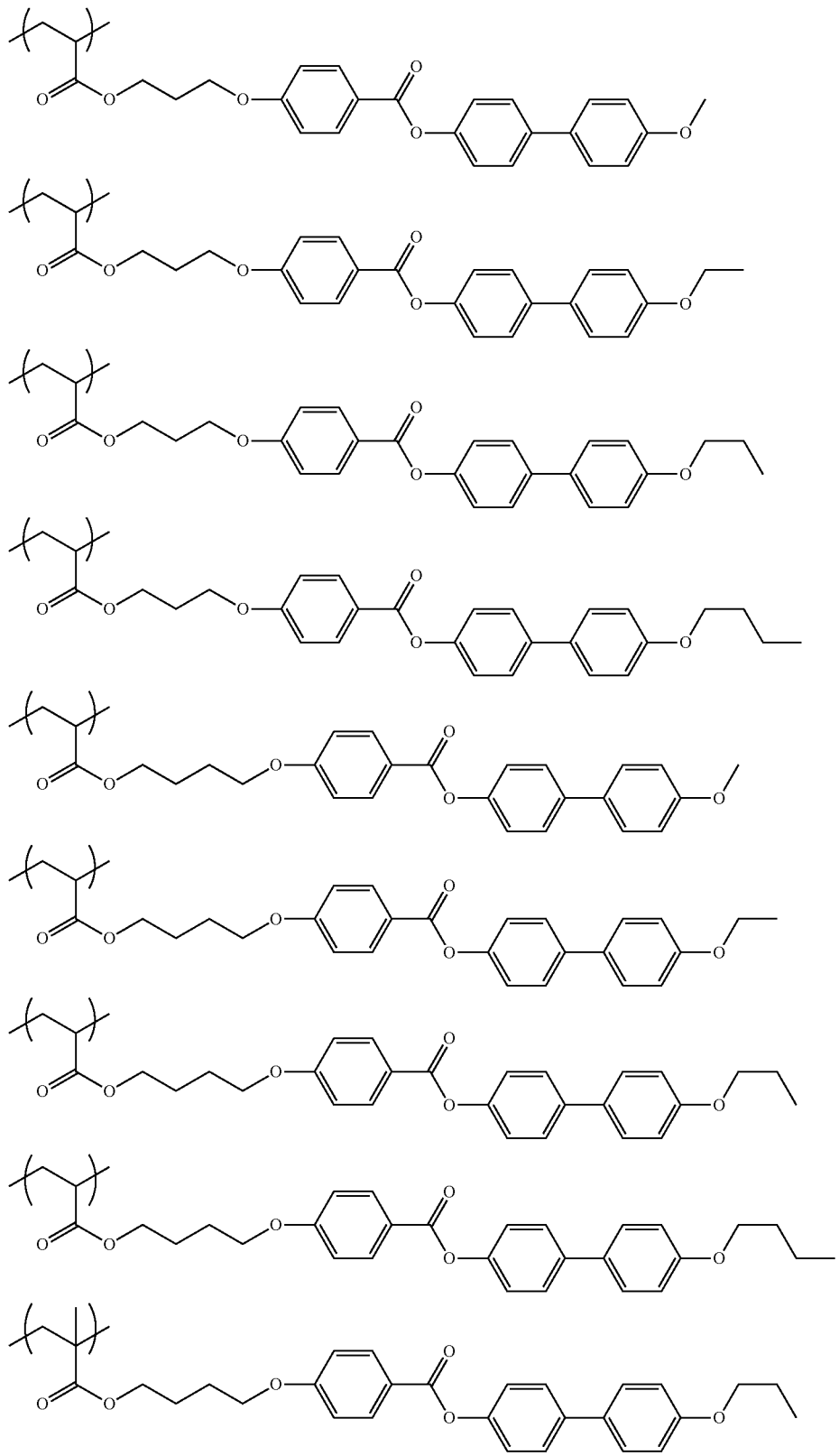

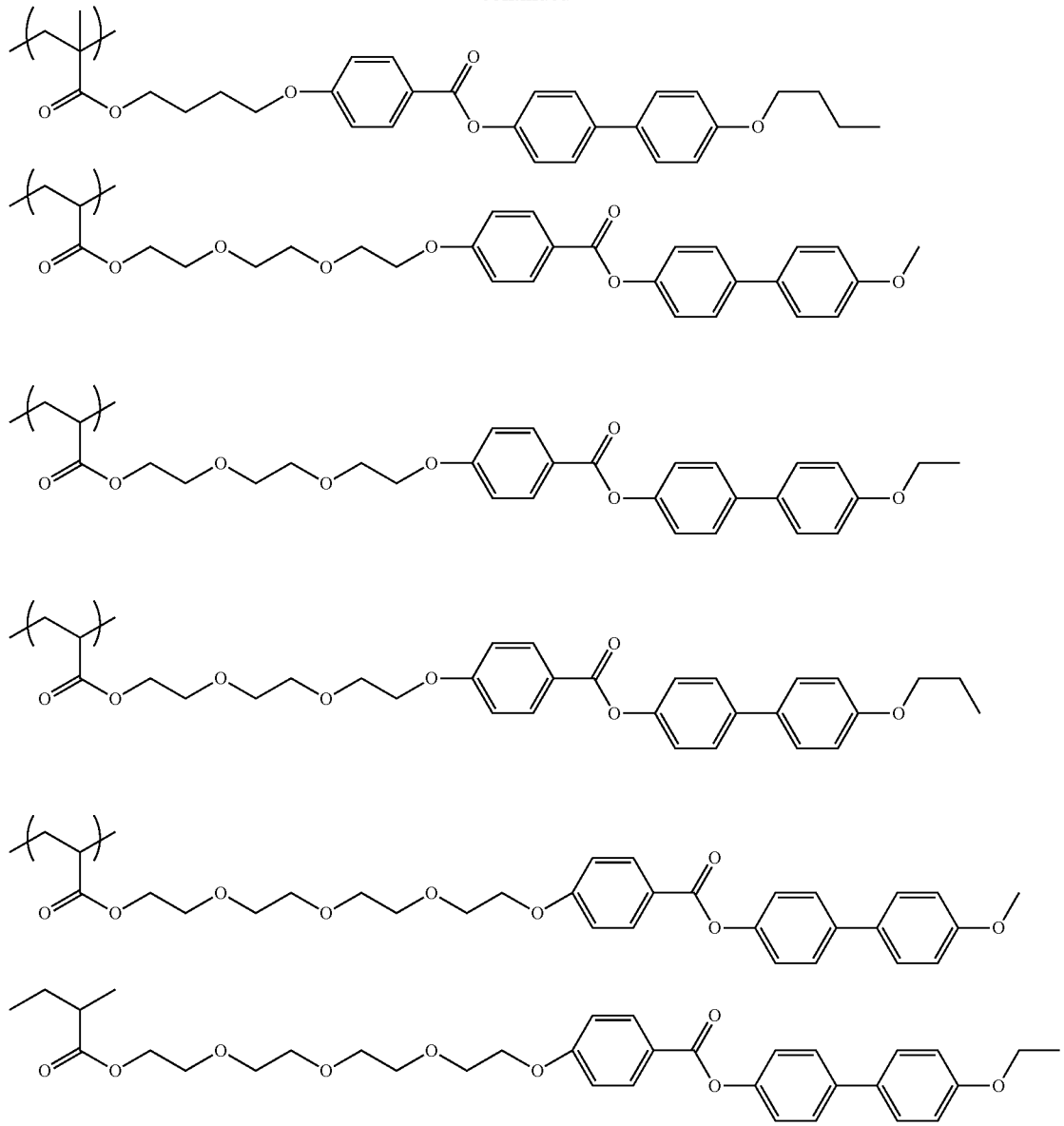

lp;2p

The content of the liquid crystal compound in the composition is preferably 10 to 20 mass %, and more preferably 12 to 18 mass % with respect to the total solid content in the composition.

The liquid crystal compounds may be used alone or in combination of two or more. In a case where two or more liquid crystal compounds are used, the total amount thereof is preferably within the above range.

The solid content means the components excluding the solvent in the composition. Even in a case where the components are liquids, these are calculated as solids.

The composition may contain a component other than the dichroic substance and the liquid crystal compound.

The composition preferably contains a vertical alignment agent. In a case where the composition contains a vertical alignment agent, the dichroic substance and the liquid crystal compound can be more vertically aligned, and the degree of alignment order can be increased.

Examples of the vertical alignment agent include boronic acid compounds and onium salts.

The boronic acid compound is preferably a compound represented by Formula (30).

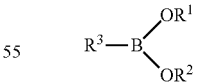

Formula (30)

In Formula (30), $R^1$ and $R^2$ each independently represent a hydrogen atom, a substituted or unsubstituted aliphatic hydrocarbon group, a substituted or unsubstituted aryl group, or a substituted or unsubstituted heterocyclic group.

$R^3$ represents a substituent containing a (meth)acryloyl group.

Specific examples of the boronic acid compound include boronic acid compounds represented by Formula (I) described in paragraphs 0023 to 0032 of JP2008-225281A.

Compounds exemplified below are also preferable as the boronic acid compound.

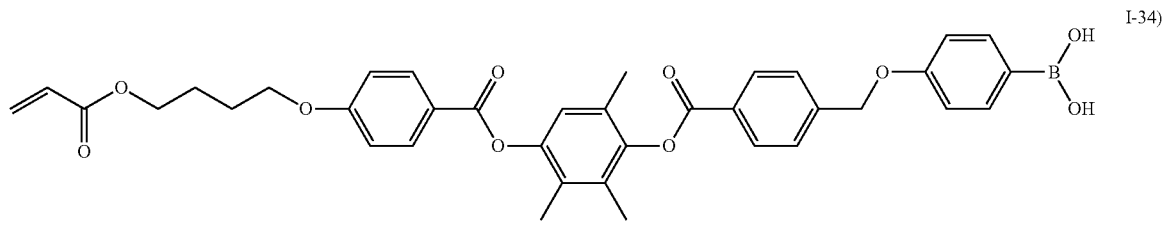

I-34)

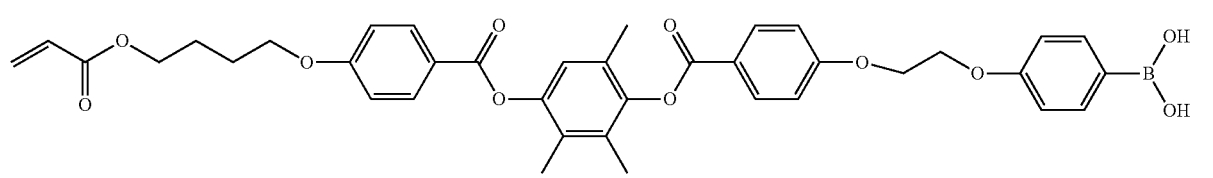

I-35)

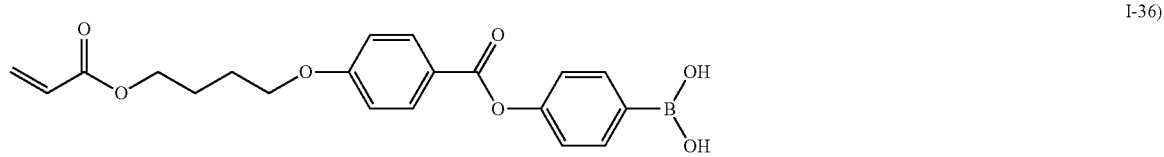

I-36)

The onium salt is preferably a compound represented by Formula (31).

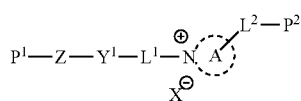

Formula (31)

In Formula (31), the ring A represents a quaternary ammonium ion including a nitrogen-containing heterocyclic ring. X represents an anion. $L^1$ represents a divalent linking group. $L^2$ represents a single bond or a divalent linking group. $Y^1$ represents a divalent linking group having a 5- or 6-membered ring as a partial structure. Z represents a divalent linking group having 2 to 20 alkylene groups as a partial structure. $P^1$ and $P^2$ each independently represent a monovalent substituent having a polymerizable ethylenically unsaturated bond.

Specific examples of the onium salt include onium salt described in paragraphs 0052 to 0058 of JP2012-208397A, onium salt described in paragraphs 0024 to 0055 of JP2008-026730A, and onium salt described in JP2002-037777A.

The content of the vertical alignment agent in the composition is preferably 0.1 to 400 mass %, and more preferably 0.5 to 350 mass % with respect to the total mass of the liquid crystal compound.

The vertical alignment agents may be used alone or in combination of two or more. In a case where two or more vertical alignment agents are used, the total amount thereof is preferably within the above range.

The composition preferably contains a leveling agent. In a case where the composition contains a leveling agent, roughening of the surface state due to the drying air on the surface of the anisotropic light absorbing layer is suppressed, and the dichroic substance is more uniformly aligned.

The leveling agent is not particularly limited, but a leveling agent containing a fluorine atom (fluorine-based leveling agent) or a leveling agent containing a silicon atom (silicon-based leveling agent) is preferable, and a fluorine-based leveling agent is more preferable.

Examples of the fluorine-based leveling agent include fatty acid esters of polyvalent carboxylic acids in which a part of fatty acids is substituted with a fluoroalkyl group, and polyacrylates having a fluoro substituent. In particular, in a case where a rod-like compound is used as the dichroic substance and the liquid crystal compound, a leveling agent containing a repeating unit derived from a compound represented by Formula (40) is preferable from the viewpoint of promoting the vertical alignment of the dichroic substance and the liquid crystal compound.

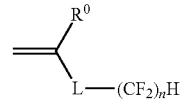

Formula (40)

$R^0$ represents a hydrogen atom, a halogen atom, or a methyl group.

L represents a divalent linking group. L is preferably an alkylene group having 2 to 16 carbon atoms, and non-adjacent optional —CH$_2$— groups in the alkylene group may be substituted with —O—, —COO—, —CO—, or —CONH—.

n represents an integer of 1 to 18.

The leveling agent having a repeating unit derived from the compound represented by Formula (40) may further contain other repeating units.

Examples of other repeating units include a repeating unit derived from a compound represented by Formula (41).

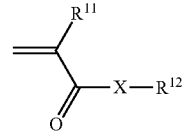

Formula (41)

$R^{11}$ represents a hydrogen atom, a halogen atom, or a methyl group.

X represents an oxygen atom, a sulfur atom, or —N($R^{13}$)—. $R^{13}$ represents a hydrogen atom or an alkyl group having 1 to 8 carbon atoms.

$R^{12}$ represents a hydrogen atom, an alkyl group optionally having a substituent, or an aromatic group optionally having a substituent. The number of carbon atoms of the alkyl group is preferably 1 to 20. The alkyl group may be linear, branched, or cyclic.

Examples of the optional substituent of the alkyl group include a poly(alkyleneoxy) group and a polymerizable group. The definition of the polymerizable group is as described above.

In a case where the leveling agent contains a repeating unit derived from a compound represented by Formula (40) and a repeating unit derived from a compound represented by Formula (41), the content of the repeating unit derived from the compound represented by Formula (40) is preferably 10 to 90 mol %, and more preferably 15 to 85 mol % with respect to all the repeating units contained in the leveling agent.

In a case where the leveling agent contains a repeating unit derived from a compound represented by Formula (40) and a repeating unit derived from a compound represented by Formula (41), the content of the repeating unit derived from the compound represented by Formula (41) is preferably 10 to 90 mol %, and more preferably 5 to 85 mol % with respect to all the repeating units contained in the leveling agent.

Examples of the leveling agent also include a leveling agent containing a repeating unit derived from a compound represented by Formula (42) instead of the repeating unit derived from the compound represented by Formula (40).

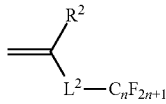

Formula (42)

$R^2$ represents a hydrogen atom, a halogen atom, or a methyl group.

$L^2$ represents a divalent linking group.

n represents an integer of 1 to 18.

Specific examples of the leveling agent include compounds exemplified in paragraphs 0046 to 0052 of JP2004-331812A and compounds described in paragraphs 0038 to 0052 of JP2008-257205A.

The content of the leveling agent in the composition is preferably 10 to 80 mass %, and more preferably 20 to 60 mass % with respect to the total mass of the liquid crystal compound.

The leveling agents may be used alone or in combination of two or more. In a case where two or more leveling agents are used, the total amount thereof is preferably within the above range.

The composition may contain a polymerization initiator.

The kind of the polymerization initiator is not particularly limited. Examples of the polymerization initiator include a photopolymerization initiator and a thermal polymerization initiator, and a photopolymerization initiator is preferable. The polymerization initiator may be any one of a radical polymerization initiator or a cationic polymerization initiator.

As the polymerization initiator, at least one selected from the group consisting of an oxime ester compound and an acylphosphine compound is preferable from the viewpoint that the anisotropic light absorbing layer has more excellent durability.

In a case where the composition contains a polymerization initiator, the content of the polymerization initiator is preferably 0.01 to 30 parts by mass, and more preferably 0.1 to 15 parts by mass with respect to 100 parts by mass in total of the dichroic substance and the liquid crystal compound in the composition.

The polymerization initiators may be used alone or in combination of two or more. In a case where two or more polymerization initiators are used, the total amount thereof is preferably within the above range.

The composition preferably contains a solvent from the viewpoint of workability.

Examples of the solvent include ketones, ethers, aliphatic hydrocarbons (for example, hexane), alicyclic hydrocarbons, aromatic hydrocarbons, halogenated carbons, esters, alcohols, cellosolves, cellosolve acetates, sulfoxides, amides, organic solvents for heterocyclic compounds, and water.

In a case where the composition contains a solvent, the content of the solvent is preferably 80 to 99 mass %, and more preferably 83 to 97 mass % with respect to the total mass of the liquid crystal composition.

The solvents may be used alone or in combination of two or more. In a case where two or more solvents are used, the total amount thereof is preferably within the above range.

The method of forming an anisotropic light absorbing layer formed of the above-described composition is not particularly limited, and examples thereof include a method including in order: a step of applying the composition to a predetermined base to form a coating film (hereinafter, also referred to as "coating film forming step"); a step of aligning the liquid crystalline component contained in the coating film (hereinafter, also referred to as "alignment step"), and a step of performing a curing treatment on the coating film (hereinafter, also referred to as "curing step").

The liquid crystalline component includes not only the above-described liquid crystal compound, but also a dichroic substance having liquid crystallinity in a case where the above-described dichroic substance has liquid crystallinity.

Hereinafter, the steps will be described in detail.

The coating film forming step is a step of applying the composition to a predetermined base to form a coating film.

The kind of the base is not particularly limited, and examples of the base include a transparent support and a laminate in which an alignment film is disposed on a transparent support.

Examples of the material for forming the transparent support include polycarbonate-based polymers; polyester-based polymers such as polyethylene terephthalate (PET) and polyethylene naphthalate; acrylic polymers such as polymethylmethacrylate; styrene-based polymers such as polystyrene and acrylonitrile-styrene copolymers (AS resins); polyolefin-based polymers such as polyethylene, polypropylene, and ethylene-propylene copolymers; vinyl chloride-based polymers; amide-based polymers such as nylon and aromatic polyamides; imide-based polymers; sulfone-based polymers; polyether sulfone-based polymers; polyether ether ketone-based polymers; polyphenylene sulfide-based polymers; vinylidene chloride-based polymers; vinyl alcohol-based polymers; vinyl butyral-based polymers; arylate-based polymers; polyoxymethylene-based polymers; and epoxy-based polymers.

Thermoplastic norbornene-based resins are also preferable as a material for forming the transparent support. Examples of the thermoplastic norbornene-based resins include ZEONEX and ZEONOR manufactured by ZEON CORPORATION, and ARTON manufactured by JSR Corporation.

In addition, cellulose-based polymers typified by triacetyl cellulose (TAC) are also preferable as a material for forming the transparent support.

The thickness of the transparent support is not particularly limited, and is preferably 100 μm or less, more preferably 80 μm or less, and even more preferably 10 to 80 μm.

In this specification, the term "transparent" means that the transmittance of visible light is 60% or greater, and the transmittance is preferably 80% or greater, and more preferably 90% or greater.

The alignment film generally contains a polymer as a main component. The polymer for the alignment film is described in many literatures, and many commercially available products can be obtained. The polymer to be used is preferably polyvinyl alcohol (PVA), polyimide, or a derivative thereof.

The alignment film is preferably a film subjected to a known rubbing treatment.

A photo-alignment film may be used as the alignment film. The photo-alignment film can be produced by irradiating a photo-alignment compound with linearly polarized light or unpolarized light. The photo-alignment compound is preferably a photosensitive compound having a photoreactive group that undergoes at least one of dimerization or isomerization by the action of light. In addition, the photoreactive group preferably has a skeleton of at least one derivative or compound selected from the group consisting of a cinnamic acid derivative, a coumarin derivative, a chalcone derivative, a maleimide derivative, an azobenzene compound, a polyimide compound, a stilbene compound, and a spiropyran compound.

The thickness of the alignment film is preferably 0.01 to 10 μm.

In the above description, a laminate including a transparent support and an alignment film has been described as the base, but base is not limited to this form. For example, a transparent support having a surface subjected to a rubbing treatment may be used.

Examples of the method of applying the composition include a roll coating method, a gravure printing method, a spin coating method, a wire bar coating method, an extrusion coating method, a direct gravure coating method, a reverse gravure coating method, a die-coating method, a spray method, and an inkjet method.

The alignment step is a step of aligning the liquid crystalline component contained in the coating film.

The alignment step may have a drying treatment. By the drying treatment, a component such as a solvent can be removed from the coating film. The drying treatment may be performed by a method of leaving the coating film at room temperature for a predetermined period of time (for example, natural drying), or by a heating and/or air blowing method.

Here, the liquid crystalline component contained in the liquid crystal composition may be aligned by the coating film forming step or the drying treatment described above.

In a case where the drying treatment is performed at a temperature equal to or higher than a transition temperature of the liquid crystalline component contained in the coating film to the liquid crystal phase, a heating treatment to be described later may not be performed.

The transition temperature of the liquid crystalline component contained in the coating film to the liquid crystal phase is preferably 10° C. to 250° C., and more preferably 25° C. to 190° C. from the viewpoint of production suitability and the like.

The alignment step preferably has a heating treatment. Accordingly, the liquid crystalline component contained in the coating film can be aligned.

The heating temperature during the heating treatment is preferably 10° C. to 250° C., and more preferably 25° C. to 190° C. from the viewpoint of production suitability and the like. The heating time is preferably 1 to 300 seconds, and more preferably 1 to 90 seconds.

The alignment step may have a cooling treatment to be performed after the heating treatment. The cooling treatment is a treatment of cooling the coating film after heating to room temperature (20° C. to 25° C.). Accordingly, the alignment of the liquid crystalline component contained in the coating film can be fixed. The cooling unit is not particularly limited, and the cooling can be performed by a known method.

The curing step is performed by, for example, heating and/or light irradiation (exposure). Among these, light irradiation is preferably carried out for performing the curing step.

Examples of the light to be used for curing include infrared rays, visible light, and ultraviolet rays, and ultraviolet rays are preferable. Ultraviolet rays may be applied while heating is performed during curing, or applied via a filter which transmits only light of a specific wavelength.

The exposure amount during light irradiation is not particularly limited, and is preferably 10 to 2,000 mJ/cm$^2$. From the viewpoint that the anisotropic light absorbing layer has more excellent durability, the exposure amount is more preferably 200 to 1,000 mJ/cm$^2$.

In a case where exposure is performed during heating, the heating temperature during the exposure is preferably 25° C. to 140° C.

Exposure may be performed under a nitrogen atmosphere.

The manufacturing method of the display device according to the first embodiment of the invention is not particularly limited, and examples thereof include a method of laminating the self light emitting display element and the anisotropic light absorbing layer described above.

In a case where the self light emitting display element and the anisotropic light absorbing layer are laminated, a sticking layer may be disposed between the self light emitting display element and the anisotropic light absorbing layer to stick the self light emitting display element and the anisotropic light absorbing layer together.

As the sticking layer, layers formed of various known materials can be used as long as those can be stuck to the self light emitting display element and the anisotropic light absorbing layer. The sticking layer may be, for example, a layer (adhesive layer) formed of an adhesive which has fluidity in a state of being stuck, and is then solidified, a layer (pressure sensitive adhesive layer) formed of a pressure sensitive adhesive which is a soft gel-like (rubber-like) solid in a state of being stuck, and does not change its gel-like state thereafter, or a layer formed of a material having characteristics of both an adhesive and a pressure sensitive adhesive. Specific examples of the sticking layer include an optically transparent adhesive, an optically transparent double-sided tape, and an ultraviolet curable resin.

The display device according to the embodiment of the invention may be configured by laminating the self light emitting display element and the anisotropic light absorbing layer and holding the laminate with a frame, a holding device, or the like, instead of by sticking with a sticking layer.

A display device according to a second embodiment of the invention may include a member other than the display element and the anisotropic light absorbing layer. Examples thereof include the sticking layer and the base described above.

Second Embodiment

Figure 3:
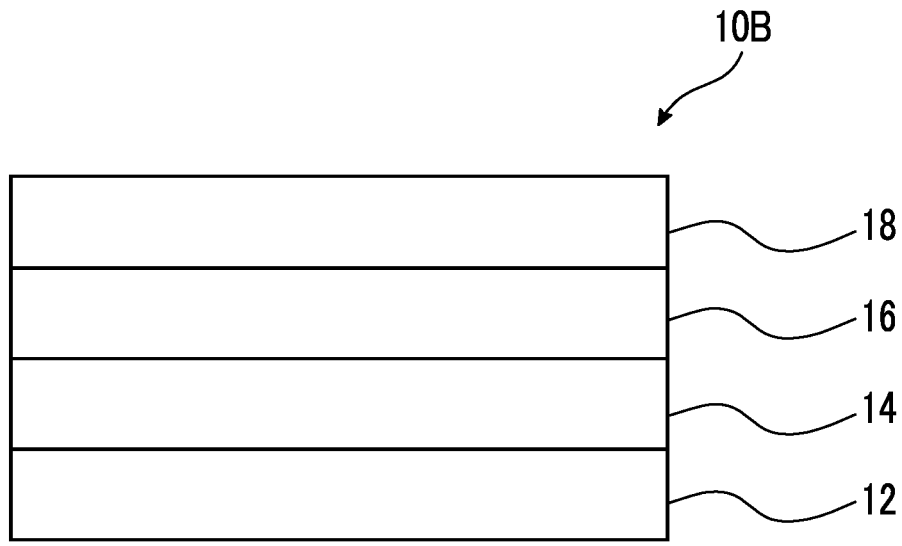
FIG. 3 is a schematic cross-sectional view showing an example of a display device according to a second embodiment of the invention.

FIG. 3 shows a schematic cross-sectional view of the display device according to the second embodiment of the invention.

As shown in FIG. 3, a display device 10B includes a self light emitting display element 12, an anisotropic light absorbing layer 14, a λ/4 plate 16, and a polarizer 18. In FIG. 3, an observer observes the display device from the polarizer 18. Accordingly, the display device 10B includes the polarizer 18, the λ/4 plate 16, the anisotropic light absorbing layer 14, and the self light emitting display element 12 in this order from the viewing side.

The display device 10B has the same configuration as the above-described display device 10A, except that the λ/4 plate 16 and the polarizer 18 are further included.

Hereinafter, the λ/4 plate 16 and the polarizer 18 will be mainly described in detail.

<λ/4 Plate>

The λ/4 plate is a plate having a λ/4 function, and specifically, a plate having a function of converting linearly polarized light of a specific wavelength into circularly polarized light (or circularly polarized light into linearly polarized light).

Specific examples of the λ/4 plate include λ/4 plate described in US2015/0277006A.

Specific examples of the aspect in which the λ/4 plate has a single layer structure include a stretched polymer film and an optically anisotropic layer formed of a liquid crystal compound.

Specific examples of the aspect in which the λ/4 plate has a multi-layer structure include a broadband λ/4 plate formed by laminating a λ/4 plate and a λ/2 plate.

Re (550) of the λ/4 plate is not particularly limited, and is preferably 110 to 160 nm, and more preferably 120 to 150 nm from the viewpoint that the λ/4 plate is useful.

The λ/4 plate preferably exhibits reciprocal wavelength dispersibility. The expression that the λ/4 plate exhibits reciprocal wavelength dispersibility means that in a case where an in-plane retardation (Re) value at a specific wavelength (visible light range) is measured, the Re value does not change or increases with an increase in the measurement wavelength.

<Polarizer>

The polarizer may be a member (linear polarizer) having a function of converting light into specific linearly polarized light, and an absorption type polarizer can be mainly used.

Examples of the absorption type polarizer include iodine-based polarizers, dichroic substance-based polarizers using dichroic substances, and polyene-based polarizers. Each of the iodine-based polarizer and the dichroic substance-based polarizer includes a coating type polarizer and a stretching type polarizer, and any type can be applied. A polarizer produced by adsorbing iodine or a dichroic substance to a polyvinyl alcohol and performing stretching is preferable.

The relationship between the absorption axis of the polarizer and the slow axis of the λ/4 plate is not particularly limited, and from the viewpoint that the laminate of the polarizer and the λ/4 plate suitably acts as a circularly polarizing plate, an angle between the absorption axis of the polarizer and the slow axis of the λ/4 plate is preferably 45°±10°.

The display device according to the second embodiment of the invention further includes a λ/4 plate and a polarizer. The two members may function as a so-called circularly polarizing plate. That is, by disposing the circularly polarizing plate including the λ/4 plate and the polarizer on the display element, the antireflection function can be imparted to the display device.

Examples of the manufacturing method of the display device according to the second embodiment of the invention include the method described in the first embodiment.

In addition, the display device according to the second embodiment of the invention may include a member other than the self light emitting display element, the anisotropic light absorbing layer, the λ/4 plate, and the polarizer. Examples thereof include the sticking layer and the base described above.

Third Embodiment

Figure 4:
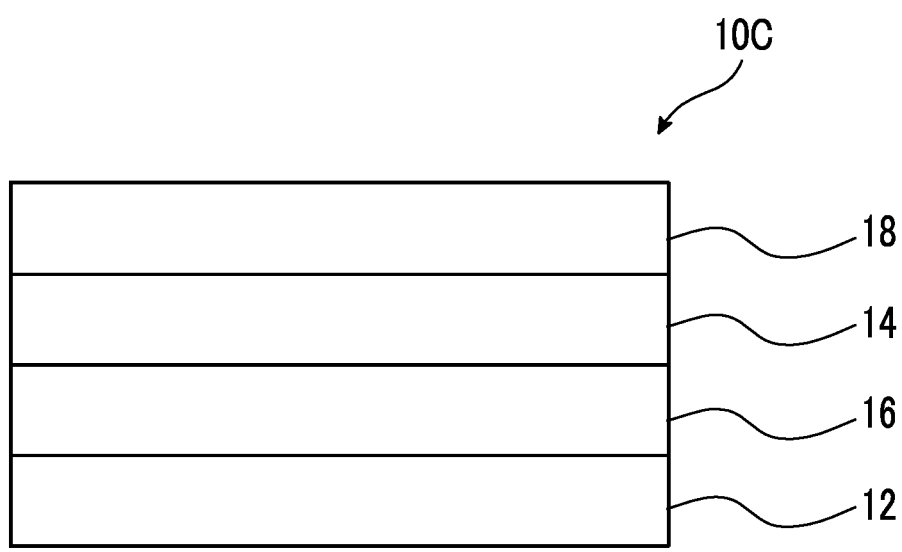
FIG. 4 is a schematic cross-sectional view showing an example of a display device according to a third embodiment of the invention.

FIG. 4 shows a schematic cross-sectional view of a display device according to a third embodiment of the invention.

As shown in FIG. 4, a display device 10C includes a self light emitting display element 12, a λ/4 plate 16, an anisotropic light absorbing layer 14, and a polarizer 18. In FIG. 4, an observer observes the display device from the polarizer 18. Accordingly, the display device 10C includes the polarizer 18, the anisotropic light absorbing layer 14, the λ/4 plate 16, and the self light emitting display element 12 in this order from the viewing side.

The display device 10C has the same configuration as the display device 10B, except for the lamination order of the anisotropic light absorbing layer 14 and the λ/4 plate 16.

In the display device 10C, the anisotropic light absorbing layer 14 is disposed between the polarizer 18 and the λ/4 plate 16, and the function of the circularly polarizing plate achieved by the polarizer 18 and the λ/4 plate 16 is imparted to the display device 10C.

Examples of the manufacturing method of the display device according to the third embodiment of the invention includes the method described in the first embodiment.

In addition, the display device according to the third embodiment of the invention may include a member other than the self light emitting display element, the anisotropic light absorbing layer, the λ/4 plate, and the polarizer. Examples thereof include the sticking layer and the base described above.

EXAMPLES

Hereinafter, the invention will be described in greater detail with examples. Materials, reagents, amounts and proportions of substances, operations, and the like shown in the following examples are able to be suitably changed unless the changes cause deviance from the gist of the invention. Therefore, the range of the invention is not limited to the following specific examples.

Example 1

(Formation of Alignment Film)

A cellulose acetate film (FUJITAC TG40, manufactured by FUJIFILM Corporation) was passed between dielectric heating rolls at a temperature of 60° C. to increase a film surface temperature to 40° C. Then, an alkali solution having the following composition was applied to one surface of the film at a coating rate of 14 ml/m² using a bar coater, and heated to 110° C. The obtained film was transported for 10 seconds under a steam type far infrared heater manufactured by NORITAKE CO., LIMITED. Next, pure water was applied to the obtained film using a bar coater at 3 ml/m². Next, water washing by a fountain coater and water removing by an air knife were performed on the obtained film three times, and then the film was transported to a drying zone at 70° C. for 10 seconds and dried to produce an alkali-saponified cellulose acetate film.

| Alkali Solution | |
|---|---|
| Potassium Hydroxide | 4.7 parts by mass |
| Water | 15.8 parts by mass |
| Isopropanol | 63.7 parts by mass |
| Surfactant ($C_{14}H_{29}O(CH_2CH_2O)_{20}H$) | 1.0 part by mass |
| Propylene Glycol | 14.8 parts by mass |

The following alignment film forming composition 1 was applied to the alkali-saponified cellulose acetate film using a #12 bar, and the obtained film was dried at 110° C. for 2 minutes to form an alignment film 1.

| Alignment Film Forming Composition 1 | |
|---|---|
| Following Modified Polyvinyl Alcohol | 2.00 parts by mass |
| Water | 74.08 parts by mass |
| Methanol | 23.76 parts by mass |
| Photopolymerization initiator (IRGACURE 2959, manufactured by BASF SE) | 0.06 parts by mass |

Modified Polyvinyl Alcohol (a compound represented by the following formula. In the formula, a numerical value attached to a repeating unit represents a molar ratio of the repeating unit to all repeating units.)

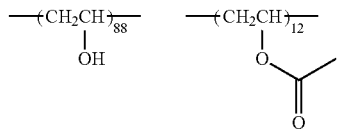

(Formation of Anisotropic Light Absorbing Layer)

An anisotropic light absorbing layer forming composition A1 was applied to the obtained alignment film 1 using a bar coater to form a coating film. The coating film was dried at room temperature for 30 seconds, heated to 145° C., held for 20 seconds, and cooled to room temperature. Next, the coating film cooled to room temperature was irradiated with ultraviolet rays (exposure amount: 500 mJ/cm², using an extra high pressure mercury lamp) to fix the alignment, and a film 1 having an anisotropic light absorbing layer was produced. The anisotropic light absorbing layer had a film thickness of 1.5 μm.

| Anisotropic Light absorbing Layer Forming Composition A1 | |
|---|---|
| Liquid Crystal Compound P-1 | 16.7 parts by mass |
| Compound B1 | 16.7 parts by mass |
| Compound E1 | 28.5 parts by mass |
| Compound E2 | 28.5 parts by mass |
| Polymerization Initiator (IRGACURE 819, manufactured by BASF SE) | 0.15 parts by mass |
| Leveling Agent L1 | 6.95 parts by mass |
| Leveling Agent L2 | 2.49 parts by mass |
| Tetrahydrofuran | 11,012 parts by mass |
| Cyclopentanone | 1,943 parts by mass |

Liquid Crystal Compound P-1 (a compound represented by the following formula. In the formula, a numerical value attached to a repeating unit represents a molar ratio of the repeating unit to all repeating units.)

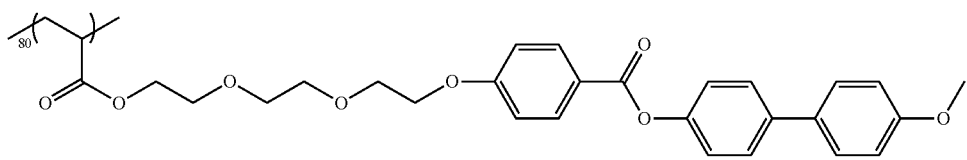

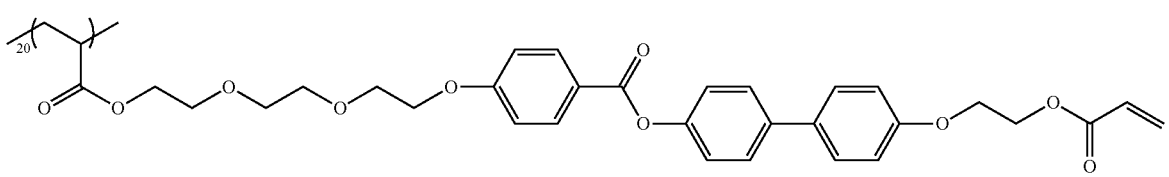

Compound B1 (a compound represented by the following formula)

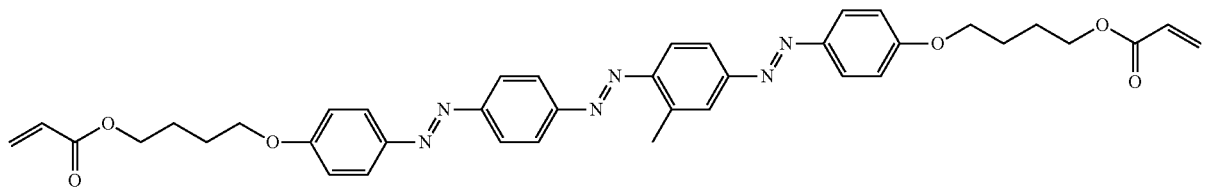

Compound E1 (a compound represented by the following formula)

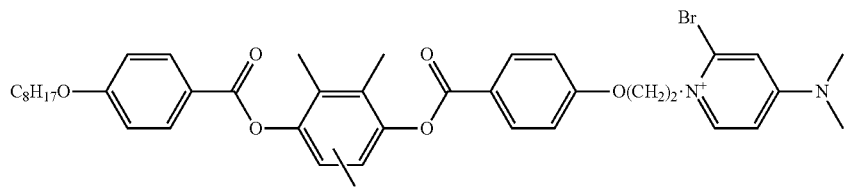

Compound E2 (a compound represented by the following formula)

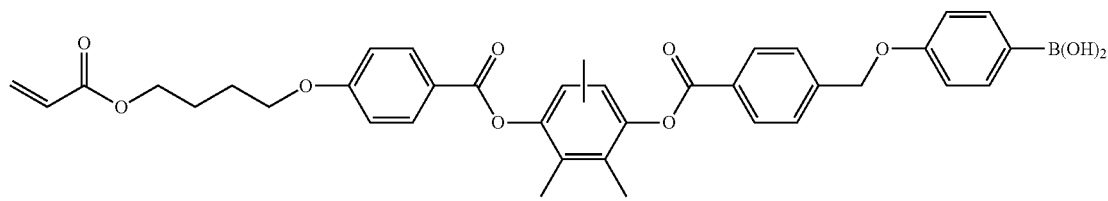

Leveling Agent L1 (a compound represented by the following formula. In the formula, a numerical value attached to a repeating unit represents a molar ratio of the repeating unit to all repeating units.)

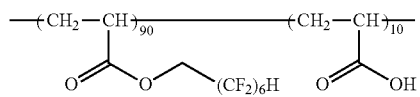

Leveling Agent L2 (a compound represented by the following formula. In the formula, a numerical value attached to a repeating unit represents a molar ratio of the repeating unit to all repeating units.)

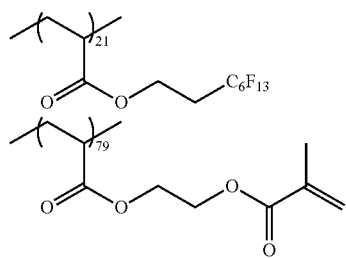

(Vertical Alignment Property Evaluation)

In a case where a film thickness direction of the obtained anisotropic light absorbing layer was represented by a z-axis, in a state of crossed nicols (crossed nicols) in which the vibration direction of a polarizer of a polarizing microscope and the vibration direction of an analyzer were orthogonal to each other, the anisotropic light absorbing layer was installed between the crossed nicols, and observation was performed from a direction of the z-axis to perform sensory evaluation of a transmitted light intensity.

The transmitted light intensity was evaluated by rotating the azimuthal angle of the anisotropic light absorbing layer by 360° with the z-axis as a rotating axis. A case where there is light leak indicates that the azimuth axis has refractive index anisotropy. A case where there is no light leak indicates that the liquid crystalline moiety constituting the anisotropic light absorbing layer is uniformly vertically aligned. The results are shown in Table 1.

A: No transmitted light can be observed in all directions (good vertical alignment).

B: There is a direction in which transmitted light is slightly observed (slightly tilted vertical alignment).

C: Transmitted light is slightly observed in all directions (slight disorder of alignment).

D: Transmitted light is observed in all directions (large disorder of alignment).

Example 2

A film 2 having an anisotropic light absorbing layer was produced in the same procedures as in Example 1, except that the compound B1 was replaced by the following compound B2 in the anisotropic light absorbing layer forming composition A1. The results of the vertical alignment property evaluation are shown in Table 1.

Compound B2 (a compound represented by the following formula)

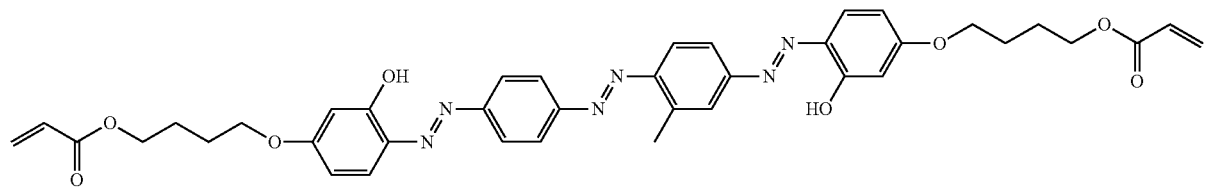 [SMILES: C=CC(=O)OCCCCOc1ccc(/N=N/c2ccc(/N=N/c3ccc(/N=N/c4ccc(OCCCCOC(=O)C=C)cc4O)cc3C)cc2)c(O)c1]

Example 3

A film 3 having an anisotropic light absorbing layer was produced in the same procedures as in Example 1, except that the exposure amount was changed from 500 mJ/cm² to 100 mJ/cm² in the formation of the film having an anisotropic light absorbing layer. The results of the vertical alignment property evaluation are shown in Table 1.

Example 4

A film 4 having an anisotropic light absorbing layer was produced in the same procedures as in Example 1, except that IRGACURE 907 (manufactured by BASF SE) was used instead of IRGACURE 819 as the photopolymerization initiator in the anisotropic light absorbing layer forming composition A1. The results of the vertical alignment property evaluation are shown in Table 1.

Example 5

A film 5 having an anisotropic light absorbing layer was produced in the same procedures as in Example 1, except that the compound B1 was replaced by the following compound B4 in the anisotropic light absorbing layer forming composition A1. The results of the vertical alignment property evaluation are shown in Table 1.

Compound B4 (a compound represented by the following formula)

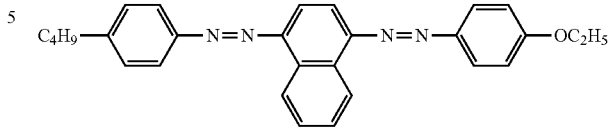

Example 6

A film 6 having an anisotropic light absorbing layer was produced in the same procedures as in Example 1, except that the liquid crystal compound P-1 was replaced by a liquid crystal compound P-2 in the anisotropic light absorbing layer forming composition A1. The results of the vertical alignment property evaluation are shown in Table 1.

Liquid Crystal Compound P-2 (a compound represented by the following formula. In the formula, a numerical value attached to a repeating unit represents a molar ratio of the repeating unit to all repeating units.)

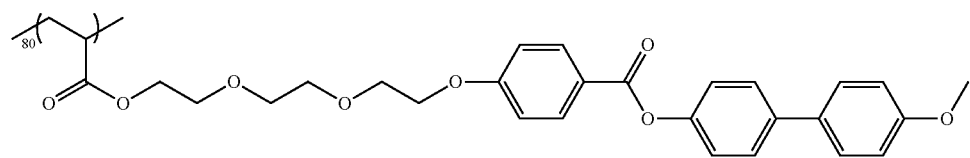

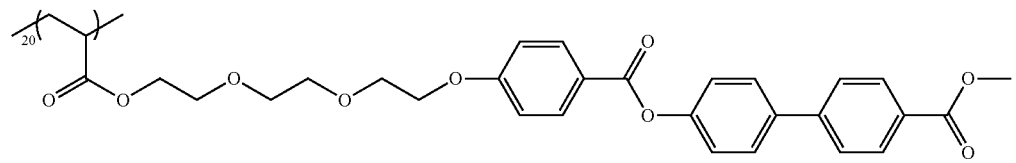

Comparative Example 1

A film 7 having an anisotropic light absorbing layer was produced in the same procedures as in Example 1, except that the compound B1 was replaced by the following compound B3 in the anisotropic light absorbing layer forming composition A1. The results of the vertical alignment property evaluation are shown in Table 1.

Compound B3 (a compound represented by the following formula)

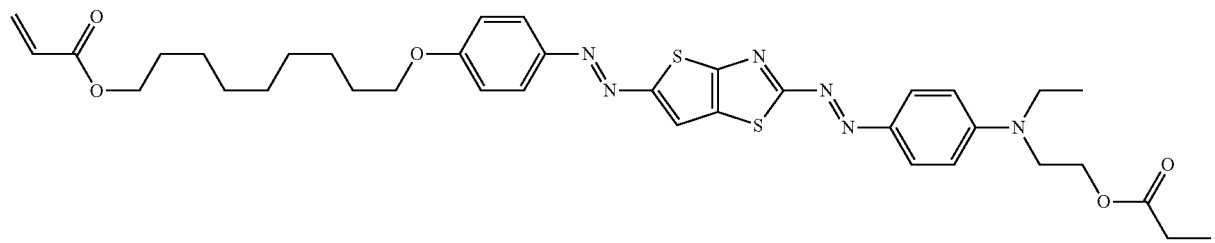 [SMILES: C=CC(=O)OCCCCCCCCCOc1ccc(/N=N/c2cc3sc(/N=N/c4ccc(N(CC)CCOC(=O)CC)cc4)nc3s2)cc1]

Comparative Example 2

A film 8 having an anisotropic light absorbing layer was produced in the same procedures as in Example 1, except that an anisotropic light absorbing layer forming composition A2 was used instead of the anisotropic light absorbing layer forming composition A1. The results of the vertical alignment property evaluation are shown in Table 1.

| Anisotropic Light Absorbing Layer Forming Composition A2 | |
|---|---|
| Liquid Crystal Compound P-1 | 22.3 parts by mass |
| Compound B1 | 11.1 parts by mass |
| Compound E1 | 28.5 parts by mass |
| Compound E2 | 28.5 parts by mass |
| Polymerization Initiator (IRGACURE 819, manufactured by BASF SE) | 0.15 parts by mass |
| Leveling agent L1 | 7.0 parts by mass |
| Leveling agent L2 | 2.5 parts by mass |
| Tetrahydrofuran | 11,012 parts by mass |
| Cyclopentanone | 1,943 parts by mass |

Comparative Example 3

A film 9 having an anisotropic light absorbing layer was produced in the same procedures as in Example 1, except that an anisotropic light absorbing layer forming composition A3 was used instead of the anisotropic light absorbing layer forming composition A1. The results of the vertical alignment property evaluation are shown in Table 1.

| Anisotropic Light Absorbing Layer Forming Composition A3 | |
|---|---|
| Liquid Crystal Compound P-1 | 38.8 parts by mass |
| Compound B1 | 38.8 parts by mass |
| Polymerization Initiator (IRGACURE 819, manufactured by BASF SE) | 0.36 parts by mass |
| Leveling Agent L1 | 16.2 parts by mass |
| Leveling Agent L2 | 5.8 parts by mass |
| Tetrahydrofuran | 11,012 parts by mass |
| Cyclopentanone | 1,943 parts by mass |

Comparative Example 4

A film 10 having an anisotropic light absorbing layer was produced in the same procedures as in Example 1, except that an anisotropic light absorbing layer forming composition A4 was used instead of the anisotropic light absorbing layer forming composition A1. The results of the vertical alignment property evaluation are shown in Table 1.

| Anisotropic Light Absorbing Layer Forming Composition A4 | |
|---|---|
| Liquid Crystal Compound P-1 | 18.4 parts by mass |
| Compound B1 | 18.4 parts by mass |
| Compound E1 | 31.5 parts by mass |
| Compound E2 | 31.5 parts by mass |
| Polymerization Initiator (IRGACURE 819, manufactured by BASF SE) | 0.17 parts by mass |
| Tetrahydrofuran | 11,012 parts by mass |
| Cyclopentanone | 1,943 parts by mass |

<Evaluation>
(Measurement of Anisotropy in Absorbance)

The anisotropy in absorbance of each of the produced films 1 to 10 having an anisotropic light absorbing layer was measured as follows.

Using a spectrophotometer (UV-3150 manufactured by Shimadzu Corporation), a three-dimensional absorbance at the maximum absorption wavelength was measured in a wavelength range of 380 to 680 nm in 2 nm-steps by a double beam method. Here, the three-dimensional absorbance is an absorbance in each direction to incident parallel light (Ax, Ay, Az), in a case where an azimuthal angle at which the highest absorbance is observed in the measurement of the absorbance of the anisotropic light absorbing layer at the maximum absorption wavelength at all azimuthal angles at a polar angle of 60° from the normal direction of the anisotropic light absorbing layer is defined as an x-axis, an azimuthal angle at which the lowest absorbance is observed in the measurement of the absorbance of the anisotropic light absorbing layer at the maximum absorption wavelength at all azimuthal angles at a polar angle of 60° from the normal direction of the anisotropic light absorbing layer is defined as a y-axis, and the normal direction of the anisotropic light absorbing layer is defined as a z-axis. Specifically, the measurement was performed by rotating a sample around the linearly polarized light as measurement light. Here, Amax (60)=Ax (60), Amin (60)=Ay (60), and A (0)=Az are satisfied. Values of Amax (60), Amin (60), A (0), Amax (60)/Amax (0), and Amax (60)/Amin (60) are shown in Table 1.

(Quantification of Polymerizable Ethylenically Unsaturated Bonding Amount)

Among two surfaces of each of the films 1 to 10 having an anisotropic light absorbing layer, which are perpendicular to the thickness direction, a surface opposite to the alignment film side of the anisotropic light absorbing layer was stuck to an adhesive layer. Then, the anisotropic light absorbing layer was stuck to a temporary support film via the adhesive layer, and the cellulose acetate film was peeled off to produce laminate samples R1 to R10.

Regarding the laminate samples R1 to R10 obtained and anisotropic light absorbing layers 1 to 10 before transfer, an infrared total reflection absorption spectrum was measured by Nicolet 6700 (manufactured by Thermo Fisher Scientific Inc.). From the obtained measurement results (values of a peak intensity I(1) derived from in-plane deformation vibration (1,408 cm$^{-1}$) of the ethylenically unsaturated bond and a peak intensity I(2) derived from stretching vibration (1,504 cm$^{-1}$) of the unsaturated bond of the aromatic ring), P1 (a value in the surface opposite to the alignment film) and P2 (a value in the surface which was in contact with the alignment film) were calculated, and a ratio of P1 to P2 was calculated. The results are shown in Table 1.

In Table 1, the column "λmax (nm)" shows the maximum absorption wavelength (nm) of the dichroic substance.

In the column "Presence or Absence of Polymerizable Group", "A" represents a case where both the dichroic substance and the liquid crystal compound have a polymerizable group, "B" represents a case where the liquid crystal compound has a polymerizable group, but the dichroic substance has no polymerizable group, and "C" represents a case where the liquid crystal compound has no polymerizable group, but the dichroic substance has a polymerizable group.

TABLE 1

| | Film No. | λmax (nm) | Presence or Absence of Polymerizable Group | Alignment | P1/P2 | Absorption Characteristics | | | | Tint in White Display | | Durability Evaluation |
|---|---|---|---|---|---|---|---|---|---|---|---|---|
| | | | | | | Amax (60)/A (0) | Amax (60)/Amin (60) | A (0) | Amax (60) | Front | Polar Angle of 60° | |
| Example 1 | 1 | 440 | A | A | 0.96 | 1.88 | 1.02 | 0.22 | 0.41 | A | A | A |
| Example 2 | 2 | 480 | A | A | 0.98 | 1.95 | 1.02 | 0.22 | 0.43 | A | A | A |
| Example 3 | 3 | 440 | A | A | 0.85 | 1.90 | 1.01 | 0.21 | 0.40 | A | A | B |
| Example 4 | 4 | 440 | A | A | 0.75 | 1.80 | 1.03 | 0.23 | 0.41 | A | A | B |
| Example 5 | 5 | 446 | B | A | 0.95 | 1.66 | 1.02 | 0.24 | 0.40 | A | A | C |
| Example 6 | 6 | 440 | C | A | 0.87 | 1.87 | 1.02 | 0.22 | 0.41 | A | A | C |
| Comparative Example 1 | 7 | 575 | A | B | 0.92 | 1.90 | 1.10 | 0.21 | 0.40 | A | D | A |
| Comparative Example 2 | 8 | 440 | A | C | 0.97 | 1.42 | 1.10 | 0.41 | 0.58 | B | C | A |
| Comparative Example 3 | 9 | 440 | A | D | 0.98 | 1.21 | 1.35 | 0.62 | 0.75 | B | D | A |
| Comparative Example 4 | 10 | 440 | A | D | 0.97 | 1.33 | 1.32 | 0.55 | 0.73 | B | D | A |

(Mounting on Organic Light Emitting Diode (OLED) Panel)

As an OLED display element having a microcavity structure, an OLED display element was taken out from Galaxy Edge S8+ manufactured by SAMSUNG. Each of the films 1 to 10 having an anisotropic light absorbing layer was stuck to a display surface of the display element via a pressure sensitive adhesive to produce an OLED display device having an anisotropic light absorbing layer. The obtained OLED display device was operated to perform white display with the maximum brightness, and the display in a front direction was evaluated by visual confirmation. The results are shown in Table 1.
A: Neutral white
B: Substantially neutral white
C: Slightly tinted
D: Clearly tinted In addition, the obtained OLED display device was operated to perform white display with the maximum brightness, and the evaluation results at all azimuthal angles, which were the worst in the visual confirmation at all azimuthal angles at a polar angle of 60°, are shown in Table 1.
(Durability Evaluation)

The obtained films 1 to 10 were subjected to a wet-heat treatment for 500 hours under conditions of 60° C. and 90% RH. Then, Amax (60)/A (0) was measured to obtain a rate of change from Amax (60)/A (0) before the wet-heat treatment {(|Amax (60)/A (0) before wet-heat treatment-Amax (60)/A (0) after wet-heat treatment|)/Amax (60)/A (0) before wet-heat treatment×100}.
A: The rate of change is less than 20%.
B: The rate of change is 20% to less than 40%.
C: The rate of change is 40% or greater.

As shown in Table 1, a predetermined effect was confirmed in the display device according to the embodiment of the invention.

In particular, as shown from the comparison between Examples 1 to 4 and Examples 5 and 6, more excellent durability was obtained in a case where both the dichroic substance and the liquid crystal compound had a polymerizable group.

In addition, as shown from the comparison between Example 1 and Example 4, more excellent durability was obtained in a case where an oxime ester compound was used as the polymerization initiator.

EXPLANATION OF REFERENCES 10A, 10B, 10C: Display Device
12: Self Light Emitting Display Element
14: Anisotropic Light Absorbing Layer
16: λ/4 Plate
18: Polarizer

What is claimed is:

1. A laminate comprising a λ/4 plate and an anisotropic light absorbing layer formed of a composition containing a dichroic substance, a liquid crystal compound and a vertical alignment agent,
   wherein the dichroic substance has a maximum absorption wavelength of 400 to 500 nm,
   the λ/4 plate exhibits reciprocal wavelength dispersibility, and
   the anisotropic light absorbing layer satisfies a requirement represented by Expression (1-3) and a requirement represented by Expression (2), $$1.50 < A\max(60)/A(0) \leq 1.95 \qquad \text{Expression (1-3)}$$

$$1.00 \leq A\max(60)/A\min(60) \leq 1.20 \qquad \text{Expression (2)}$$

here, Amax (60) represents a highest absorbance in a case where an absorbance of the anisotropic light absorbing layer at the maximum absorption wavelength is measured at all azimuthal angles at a polar angle of 60° from a normal direction of the anisotropic light absorbing layer, Amin (60) represents a lowest absorbance in a case where an absorbance of the anisotropic light absorbing layer at the maximum absorption wavelength is measured at all azimuthal angles at a polar angle of 60° from the normal direction of the anisotropic light absorbing layer, and A (0) represents an absorbance in a case where an absorbance of the anisotropic light absorbing layer at the maximum absorption wavelength is measured in the normal direction of the anisotropic light absorbing layer.

2. The laminate according to claim 1, wherein the dichroic substance has a maximum absorption wavelength of 440 to 500 nm.

3. The laminate according to claim 1, wherein the laminate comprises a polarizer.

4. The laminate according to claim 1, wherein the laminate comprises an alignment film.

5. The laminate according to claim 1, wherein the λ/4 plate is formed of a liquid crystal compound.

6. The laminate according to claim 1, wherein the λ/4 plate has a single layer structure.

7. The laminate according to claim 1, wherein the anisotropic light absorbing layer satisfies a requirement represented by Expression (1-1), $1.70 < A\max(60)/A(0)$  Expression (1-1).

8. The laminate according to claim 1, wherein the anisotropic light absorbing layer satisfies a requirement represented by Expression (1-2), $1.80 < A\max(60)/A(0)$  Expression (1-2).

9. The laminate according to claim 1, wherein the anisotropic light absorbing layer satisfies a requirement represented by Expression (2-1), $1.00 \leq A\max(60)/A\min(60) \leq 1.10$  Expression (2-1).

10. The laminate according to claim 1, wherein the anisotropic light absorbing layer satisfies a requirement represented by Expression (2-2), $1.00 \leq A\max(60)/A\min(60) \leq 1.05$  Expression (2-2).

11. The laminate according to claim 1, wherein the anisotropic light absorbing layer satisfies a requirement represented by Expression (5-1), $0 \leq A(0) \leq 0.40$  Expression (5-1).

12. The laminate according to claim 1, wherein the anisotropic light absorbing layer satisfies a requirement represented by Expression (5-2), $0 \leq A(0) \leq 0.30$  Expression (5-2).

13. The laminate according to claim 1, wherein the anisotropic light absorbing layer satisfies a requirement represented by Expression (6-1), $0.25 \leq A\max(60) \leq 0.55$  Expression (6-1).

14. The laminate according to claim 1, wherein the anisotropic light absorbing layer satisfies a requirement represented by Expression (6-2), $0.30 \leq A\max(60) \leq 0.50$  Expression (6-2).

15. The laminate according to claim 1, wherein the liquid crystal compound has a polymerizable group including an ethylenically unsaturated bond and an aromatic ring.

16. The laminate according to claim 1, wherein the dichroic substance has an aromatic ring.

17. The laminate according to claim 1, wherein the dichroic substance is a compound represented by Formula (10),

$A^1(-N{=}N-A^2)_p-N{=}N-A^3$,  Formula (10)

in Formula (10), $A^1$ and $A^3$ each independently represent a phenyl group optionally having a substituent, a naphthyl group optionally having a substituent, or a monovalent heterocyclic group optionally having a substituent, $A^2$ represents a 1,4-phenylene group optionally having a substituent, a naphthalene-1,4-diyl group optionally having a substituent, or a divalent heterocyclic group optionally having a substituent, p represents an integer of 1 to 4, and in a case where p is an integer of 2 or more, a plurality of $A^2$'s may be the same or different.

18. The laminate according to claim 1, wherein the liquid crystal compound is a liquid crystal compound having no repeating unit in the chemical structure.

19. The laminate according to claim 18, wherein the liquid crystal compound having no repeating unit in the chemical structure is a rod-like liquid crystal compound.

20. The laminate according to claim 19, wherein the rod-like liquid crystal compound is a compound represented by Formula (20),

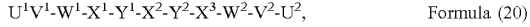

$U^1V^1-W^1-X^1-Y^1-X^2-Y^2-X^3-W^2-V^2-U^2$,  Formula (20)

in Formula (20), $X^1$, $X^2$, and $X^3$ each independently represents a 1,4-phenylene group optionally having a substituent or a cyclohexane-1,4-diyl group optionally having a substituent, at least one of $X^1$, $X^2$, or $X^3$ is a 1,4-phenylene group optionally having a substituent, —$CH_2$-constituting the cyclohexane-1,4-diyl group may be substituted with —O—, —S—, or —NR—, where R represents an alkyl group having 1 to 6 carbon atoms or a phenyl group, $Y^1$ and $Y^2$ each independently represents —$CH_2CH_2$—, —$CH_2O$—, —COO—, —OCOO—, a single bond, —N=N—, —$CR^a{=}CR^b$—, —C≡C—, or —$CR^a{=}N$—, where $R^a$ and $R^b$ each independently represents a hydrogen atom or an alkyl group having 1 to 4 carbon atoms, $U^1$ represents a hydrogen atom or a polymerizable group, $U^2$ represents a polymerizable group, $W^1$ and $W^2$ each independently represents a single bond, —O—, —S—, —COO—, or —OCOO—, and $V^1$ and $V^2$ each independently represents an alkanediyl group having 1 to 20 carbon atoms and optionally having a substituent, and —$CH_2$— constituting the alkanediyl group may be substituted with —O—, —S—, or —NH—.

21. The laminate according to claim 1, wherein the composition contains a leveling agent containing a silicon atom.

22. The laminate according to claim 1, wherein the composition contains a polymerization initiator.

23. The laminate according to claim 1,
wherein the thickness of the anisotropic light absorbing layer is 1.5 μm or less.

24. An anisotropic light absorbing layer formed of a composition containing a dichroic substance, a liquid crystal compound and a vertical alignment agent,
wherein the dichroic substance has a maximum absorption wavelength of 400 to 500 nm,
the anisotropic light absorbing layer satisfies a requirement represented by Expression (1-3) and a requirement represented by Expression (2), $$1.50 < A\max(60)/A(0) \leq 1.95 \quad \text{Expression (1-3)}$$

$$1.00 \leq A\max(60)/A\min(60) \leq 1.20 \quad \text{Expression (2)}$$

here, Amax (60) represents a highest absorbance in a case where an absorbance of the anisotropic light absorbing layer at the maximum absorption wavelength is measured at all azimuthal angles at a polar angle of 60° from a normal direction of the anisotropic light absorbing layer,
Amin (60) represents a lowest absorbance in a case where an absorbance of the anisotropic light absorbing layer at the maximum absorption wavelength is measured at all azimuthal angles at a polar angle of 60° from the normal direction of the anisotropic light absorbing layer,
A (0) represents an absorbance in a case where an absorbance of the anisotropic light absorbing layer at the maximum absorption wavelength is measured in the normal direction of the anisotropic light absorbing layer, and
provided that the anisotropic light absorbing layer excludes an anisotropic light absorbing layer comprising all of a blue dye, a green dye, and a red dye.

25. A laminate comprising the anisotropic light absorbing layer according to claim 24 and a λ/4 plate,
wherein the λ/4 plate exhibits reciprocal wavelength dispersibility.

26. An anisotropic light absorbing layer used for a display device having a self light emitting display element emitting white light,
wherein an anisotropic light absorbing layer is formed of a composition containing a dichroic substance, a liquid crystal compound and a vertical alignment agent,
a major axis direction of the dichroic substance is substantially parallel to the thickness direction of the anisotropic light absorbing layer,
the anisotropic light absorbing layer has a larger absorbance for light having a wavelength of 400 to 500 nm in a direction at a polar angle of 60° than in a front direction,
the color changes between a case where the self light emitting display element is visually confirmed from the front direction and a case where the self light emitting display element is visually confirmed from direction at a polar angle of 60°, and
the anisotropic light absorbing layer satisfies a requirement represented by Expression (1-3), $$1.50 < A\max(60)/A(0) \leq 1.95 \quad \text{Expression (1-3)}$$

where, Amax (60) represents a highest absorbance in a case where an absorbance of the anisotropic light absorbing layer at the maximum absorption wavelength is measured at all azimuthal angles at a polar angle of 60° from a normal direction of the anisotropic light absorbing layer, and
A (0) represents an absorbance in a case where an absorbance of the anisotropic light absorbing layer at the maximum absorption wavelength is measured in the normal direction of the anisotropic light absorbing layer.

27. The anisotropic light absorbing layer according to claim 26,
wherein the light rays emitted from the self light emitting display element in the oblique direction shift to blue against the light rays emitted from the self light emitting display element in the front direction.

28. The anisotropic light absorbing layer according to claim 26,
wherein the self light emitting display element is an organic electroluminescent element emitting,
the self light emitting display element emits light of a plurality of colors, and
the organic electroluminescent element emitting has a plurality of sets of upper and lower electrodes each having an optical path length therebetween, the optical path length being different among the plurality of colors.

29. The anisotropic light absorbing layer according to claim 26,
wherein the self light emitting display element has a microcavity structure.

30. The anisotropic light absorbing layer according to claim 26,
wherein the anisotropic light absorbing layer satisfies a requirement represented by Expression (2), $$1.00 \leq A\max(60)/A\min(60) \leq 1.20 \quad \text{Expression (2)}$$

here, Amax (60) represents a highest absorbance in a case where an absorbance of the anisotropic light absorbing layer at the maximum absorption wavelength is measured at all azimuthal angles at a polar angle of 60° from a normal direction of the anisotropic light absorbing layer,
Amin (60) represents a lowest absorbance in a case where an absorbance of the anisotropic light absorbing layer at the maximum absorption wavelength is measured at all azimuthal angles at a polar angle of 60° from the normal direction of the anisotropic light absorbing layer.

31. The anisotropic light absorbing layer according to claim 26,
wherein the anisotropic light absorbing layer has a larger absorbance for light having a wavelength of 440 to 500 nm in the direction at a polar angle of 60° than in the front direction.

* * * * *